United States Patent [19]
Saito et al.

[11] Patent Number: 5,513,157
[45] Date of Patent: Apr. 30, 1996

[54] LOADING APPARATUS FOR RECORDING MEDIUM AND METHOD FOR CONTROLLING THE SAME

[75] Inventors: Kenichi Saito; Kanji Mita, both of Tokyo; Hajime Kanno, Ibaraki, all of Japan

[73] Assignee: Sony Corporation, Tokyo, Japan

[21] Appl. No.: 221,503

[22] Filed: Apr. 1, 1994

[30] Foreign Application Priority Data

Apr. 2, 1993 [JP] Japan .................................. 5-100267

[51] Int. Cl.$^6$ .......................... G11B 17/035; G11B 17/22
[52] U.S. Cl. .................. 369/34; 369/37; 369/191
[58] Field of Search ............................. 369/34, 37, 75.2, 369/194, 77.1, 36, 33, 191, 192; 360/86, 99.06, 98.04, 98.05, 99.02

[56] References Cited

U.S. PATENT DOCUMENTS

| | | | |
|---|---|---|---|
| 4,561,030 | 12/1985 | Schijven | 360/93 |
| 4,652,947 | 3/1987 | Oka et al. | 360/85 |
| 4,670,866 | 6/1987 | Hasegawa et al. | 369/194 |
| 4,755,978 | 7/1988 | Takizawa et al. | 369/37 |
| 4,868,924 | 9/1989 | Ando et al. | 360/96.5 |
| 4,901,172 | 2/1990 | Nakazawa et al. | 360/98.05 |
| 4,918,549 | 4/1990 | Katono et al. | 360/93 |
| 5,043,963 | 8/1991 | Iwamoto | 369/34 |
| 5,123,005 | 6/1992 | Kurosu | 360/99.07 |
| 5,164,934 | 11/1992 | Kase et al. | 360/99.06 |
| 5,253,235 | 10/1993 | Isobe et al. | 369/191 |
| 5,285,332 | 2/1994 | Konishi et al. | 360/85 |

FOREIGN PATENT DOCUMENTS

| 508097 | 10/1992 | European Pat. Off. . |
|---|---|---|
| 541213 | 5/1993 | European Pat. Off. . |

*Primary Examiner*—Stuart S. Levy
*Assistant Examiner*—David L. Ometz
*Attorney, Agent, or Firm*—Jay H. Maioli

[57] ABSTRACT

A loading apparatus for a recording medium such as a disc-like recording medium includes a transfer member, a drive unit, a detector and a controller. The transfer member moves between a recording medium changing position and a disc-like recording medium recording and/or reproducing position. The drive unit drives the transfer member. The detector continuously detects a position of the transfer member moved on the basis of a drive force from the drive unit in accordance with a movement of a movable part of the drive unit. The controller controls the drive unit so that a moving speed of the transfer member is slowed under the condition prior to arriving at the changing position and the recording/reproducing position of the transfer member on the basis of a detection signal from the detector.

5 Claims, 20 Drawing Sheets

FIG. 19
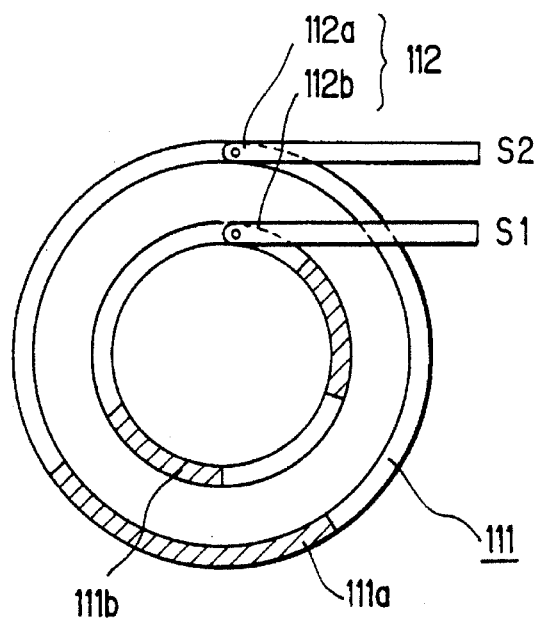
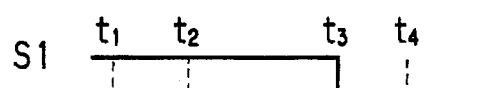
FIG. 20A
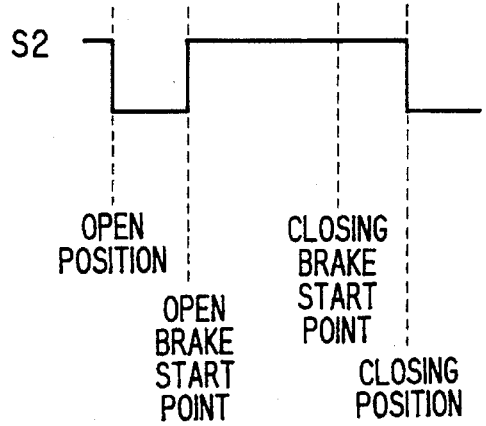
FIG. 20B

FIG. 21A  S1 ———————————————— +5
                                    ---- 0
                          t₂  t₁
FIG. 21B  S2 ——————————┐  ┌——— +5
                       BRAKE  STOP
                       START  ---- 0

FIG. 21C     ——————————————┐  ┌— +5
                           └——┘   ---- 0
             └——PWM1——┘└PWM2┘ t₃  t₄
FIG. 22A  S1 ————┐
                 └————————

FIG. 22B  S2 ——————┐
                   BRAKE  STOP
                   START
FIG. 22C     ——————┐
                   └————
             └—PWM3—┘└PWM4┘

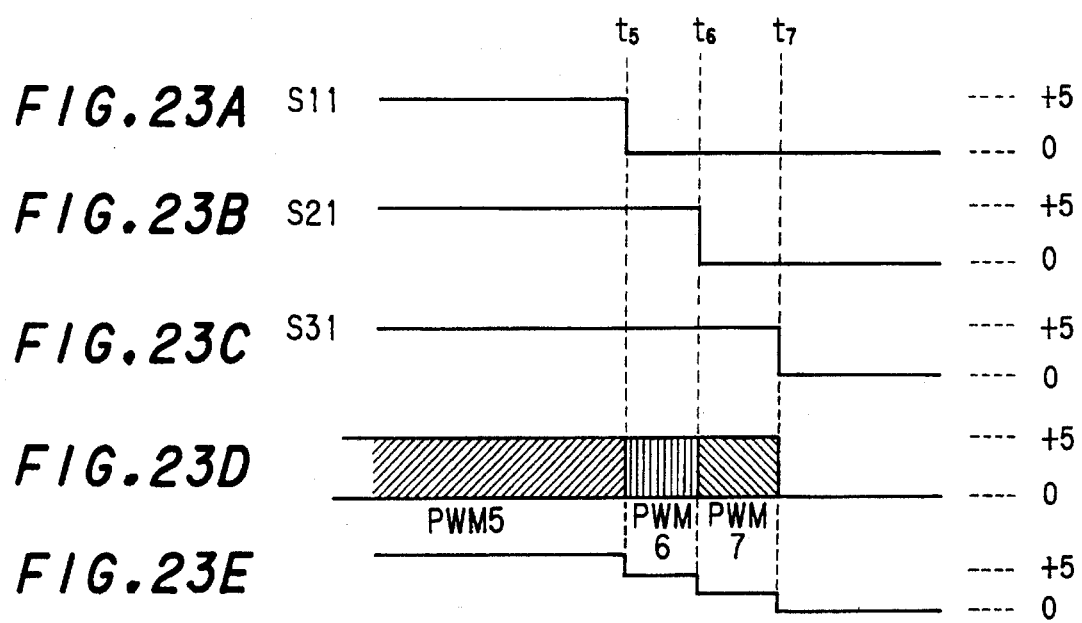

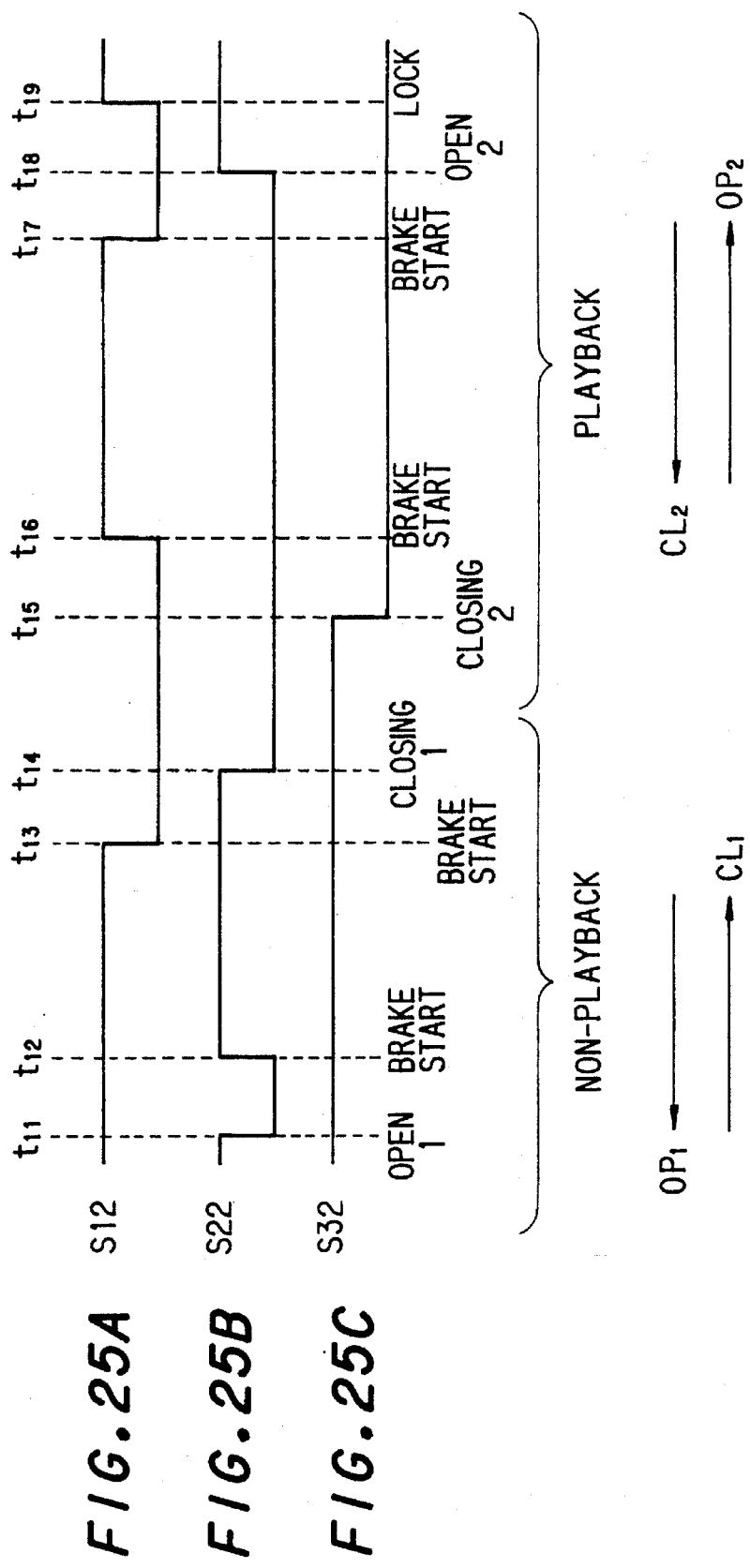

LOADING APPARATUS FOR RECORDING MEDIUM AND METHOD FOR CONTROLLING THE SAME

BACKGROUND

1. Field of the Invention

The present invention relates to a loading apparatus for a recording medium and a control method for the loading apparatus. More particularly, the present invention relates to a loading apparatus for a recording medium having a delivery member on which the recording medium is loaded and a control method for the loading apparatus.

2. Background of the Invention

In general, a disc playback player using a disc-like recording medium (which will be simply referred to as a disc) such as an optical disc is provided with a loading apparatus for loading or unloading the disc relative to the player body. As in a so-called compact disc player, the loading apparatus is provided with a disc tray which is moved among a position where the tray is projected from an opening of the player body, a disc exchanging position, a position where the tray is retracted into the player body through the opening, and a playback or reproduction position. In the case where a disc within the player is to be replaced by another outside the player and a disc is to be loaded into the player, the user of the disc player operates switches provided on the player body for operating the movement of the disc tray to extract the disc tray through the opening of the player body. The disc is loaded on a disc loading recess of the disc tray that is extracted to the outside of the player body. Thereafter, the operating switches are operated to retract the disc tray into the player body. The movement of the disc tray is stopped when it reaches the playback position within the player body. Thereafter, the disc playback portion and the disc tray are moved relative to each other and the disc on the disc tray is laid on a disc table which constitutes the disc playback portion together with an optical pickup. Under this condition, the disc is clamped by a chucking member and the disc table. When a playback command is inputted, the disc table is rotationally driven to thereby rotate the disc. After the disc has been rotated at a predetermined speed, a light beam is projected from the optical pickup to thereby read an information signal recorded on the disc. When the disc tray is unloaded, the disc playback portion and the disc tray are again moved relative to each other, the clamping of the disc between the disc table and the chucking member is released. Thereafter, as mentioned above, the disc tray is extracted through the opening of the player body.

However, in the disc player having such a disc tray, it is necessary to stop the disc tray at desired positions such as the disc exchanging position and the disc playback position as accurately as possible. In particular, it is desired that at the time when the disc tray has reached the playback position, the positions of the disc tray and the disc playback portion are precise as much as possible since these two components are moved relative to each other. For this reason, in the above-described disc player, there are provided detector switches for detecting the position of the disc tray. The detector switches are operated by the disc tray per se or a member that moves together with the disc tray. The detector switches are provided at the disc exchanging position of the disc tray and the playback position thereof, respectively. These switches are operated to be turned on or off when the disc tray reaches the exchanging position and the playback position. The output signals are fed to a controller which in turn causes a motor, that is a drive source for a moving mechanism for moving the disc tray, to stop on the basis of the output signals corresponding to the switching operation of turn-on and turn-off.

Accordingly, since the motor is rotated at a constant speed during a period before the detector switches are operated, when the detector switches are operated by the disc tray or the like, the motor will abruptly stop. The reason for this is that, although it is possible to detect the fact that the disc table reaches the exchanging position and the playback position, in the meantime, it is impossible to detect whether or not the disc tray is positioned in place. Accordingly, it is impossible to smoothly or gently stop the disc tray at the exchanging position or the playback position by controlling the moving speed of the disc tray before the disc tray has reached the exchanging position or the playback position.

In order to solve the problem, it is possible to provide a plurality of detector switches on a moving locus of the disc tray. In this case, however, not only would a cost therefor be increased, but also there would be a fear that a fabrication work efficiency would be degraded due to the necessity that operation timing of each detector switch be adjusted.

SUMMARY OF THE INVENTION

It is, therefore, an object of the present invention to provide a recording medium loading apparatus which resolves the above-mentioned problems.

It is another object of the present invention to provide a method for controlling a recording medium transferring apparatus, which resolves the above-mentioned problems.

According to the present invention, there is provided an apparatus for loading a recording medium, including a transfer member, a drive means and a control means. The transfer member transfers the recording medium between a recording medium changing position and a recording medium recording and/or reproducing position. The drive means drives the transfer member. The drive means includes a rotary drive member for driving the transfer member and a detecting portion for detecting a rotational amount of the rotary drive member. The detecting portion detects continuously a rotation of the rotary drive member. The control means controls the drive means on the basis of a detection signal from the detecting portion.

According to another aspect of the invention, there is provided an apparatus for loading a disc-like recording medium, that includes a transfer member, a drive unit, a detecting unit and a controller. The transfer member transfers the disc-like recording medium between a disc-like recording medium changing position and a disc-like recording medium recording and/or reproducing position. The drive unit drives the transfer member. The detecting unit continuously detects a position of the transfer member moved on the basis of a drive force from the drive unit in accordance with a movement of a movable part of the drive unit. The controller controls the drive unit on the basis of a detection signal from the detecting unit.

According to still another aspect of the invention, there is provided a method for controlling a transfer device for transferring a recording medium by using a transfer member which transfers the recording medium between a recording medium changing position and a recording and/or reproducing position relative to the recording medium on the basis of a drive force transmitted from a drive unit to which a PWM signal is supplied. The method includes the following steps of: continuously detecting a position of the transfer member by a detection unit in accordance with a movement of a movable part of the drive unit; producing a control signal for controlling a duty of the PWM signal in accordance with the position of the transfer member on the basis of the detection signal from the detection means; and changing the duty of the PWM signal on the basis of the control signal produced in the control signal producing step to change a moving speed of the transfer member.

According to the present invention, the position of the transfer member for the recording medium moved on the basis of the drive force of the drive unit is detected in accordance with the movement of the movable part of the drive unit. On the basis of the detection result, the motor used as a drive source for the drive unit is controlled. More specifically, the duty of the PWM signal supplied to the motor is changed on the basis of the detection result. As a result, since, prior to the changing position and the recording/reproducing position of the transfer member, the moving speed of the transfer member may be slowed down, it is possible to stop gently or smoothly the transfer member at the above-mentioned respective positions.

BRIEF DESCRIPTION OF THE DRAWINGS

In the accompanying drawings:

FIG. 19 is a plan view showing an example of a structure of an encoder shown in FIG. 18;

FIGS. 20(a) and 20(b) are timing charts for illustrating output signals of the encoder shown in FIG. 19, FIG. 20(a) being a timing chart relating to an output signal S1 and FIG. 20(b) being a timing chart relating to an output signal S2;

FIGS. 21(a) through 21(c) are timing charts for illustrating a case where an unloading operation is controlled in correspondence with the output signals shown in FIGS. 20(a) and 20(b), FIG. 21(a) being a timing chart relating to the output signal S1, FIG. 21(b) being a timing chart relating to the output signal S2, and FIG. 21(c) being a timing chart showing a change of a PWM signal;

FIGS. 22(a) through 22(c) are timing charts for illustrating a case where a loading operation is controlled in correspondence with the output signals shown in FIGS. 20(a) and 20(b), FIG. 22(a) being a timing chart relating to the output signal S1, FIG. 22(b) being a timing chart relating to the output signal S2, and FIG. 22(c) being a timing chart showing a change of a PWM signal;

FIGS. 23(a) through 23(e) are diagrams showing examples of other output signals of the encoder, FIG. 23(a) being a timing chart relating to the output signal S11, FIG. 23(b) being a timing chart relating to the output signal S21, FIG. 23(c) being a timing chart relating to the output signal S31, FIG. 23(d) being a timing chart showing a change of a PWM signal, and FIG. 23(e) being a timing chart showing a change of an average voltage to be supplied to the loading motor 32;

FIGS. 25(a) through 25(c) are diagrams for illustrating output signals of the encoder shown in FIG. 24(b), FIG. 25(a) being a timing chart relating to the output signal S12, FIG. 25(b) being a timing chart relating to the output signal S22, and FIG. 25(c) being a timing chart relating to the output signal S32.

DESCRIPTION OF THE INVENTION

An embodiment of the present invention will now be described in detail with reference to the accompanying drawings. In this embodiment, a disc player to which the present invention pertains is applied to an apparatus for reproduction of an optical audio disc which is one example of recording discs.

Figure 1:
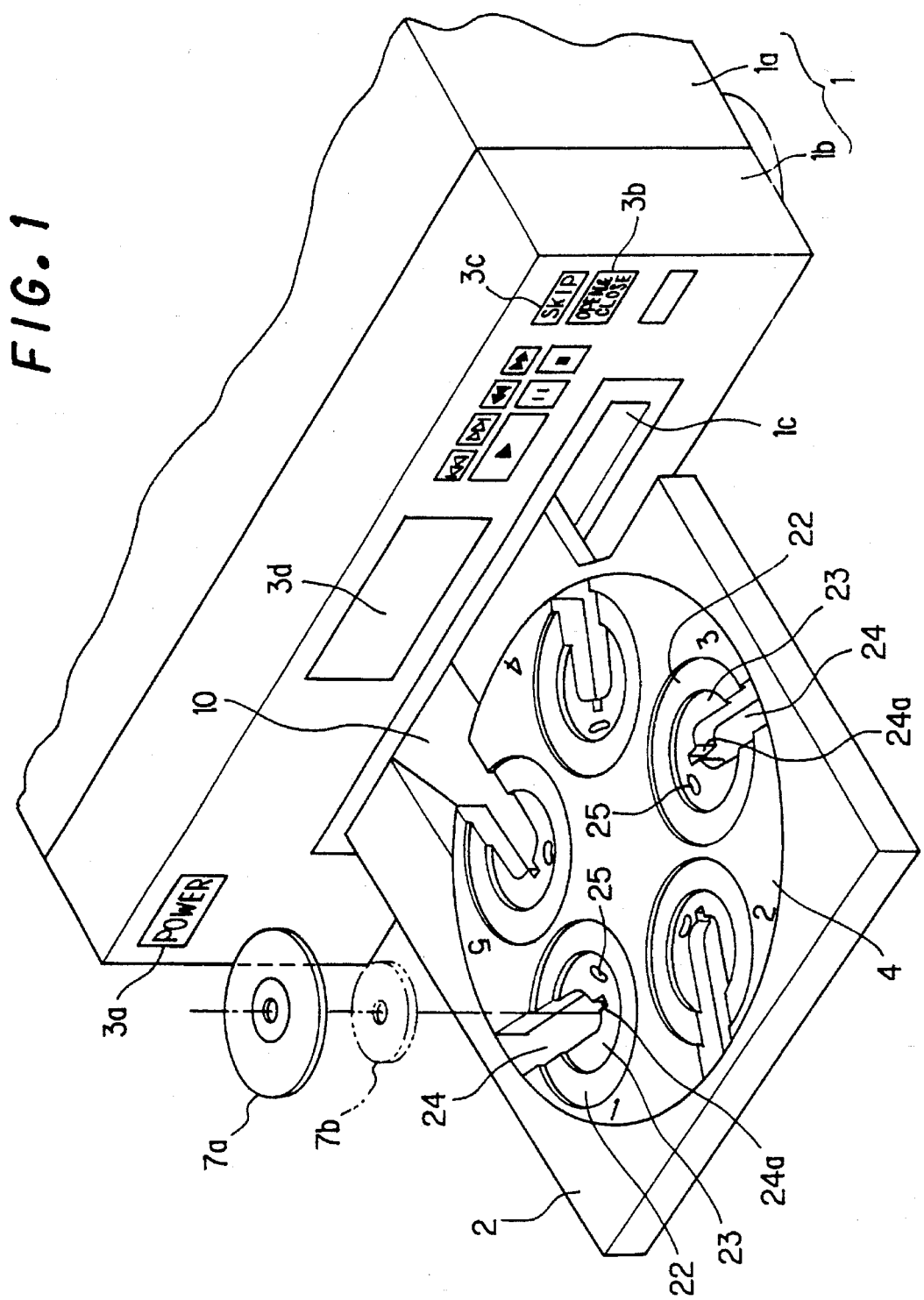
FIG. 1 is a perspective view showing a state where a disc tray and a turntable have been withdrawn from an outer casing in a disc player in accordance with an embodiment of the invention.

As shown in FIG. 1, the disc player is provided with an outer casing 1 which is composed of a box-shaped body 1a having an opening on its front side and a front panel 1b which closes the front opening of the box-shaped body 1a. A laterally extending slot 1c is formed substantially centrally of the front panel 1b. A substantially rectangular, planar disc tray 2 is mounted retractably through the slot 1c of the front panel 1b. Arranged on the front panel 1b are a power button 3a for turning on and off the power to be supplied from an external power source, an operating button 3b for operating retraction or ejection of the disc tray 2, a skip button 3c for rotating a turntable 4 held rotatably on the disc tray 2, and other buttons and the like. A display section 3d displays the input condition or play condition.

Figure 3:
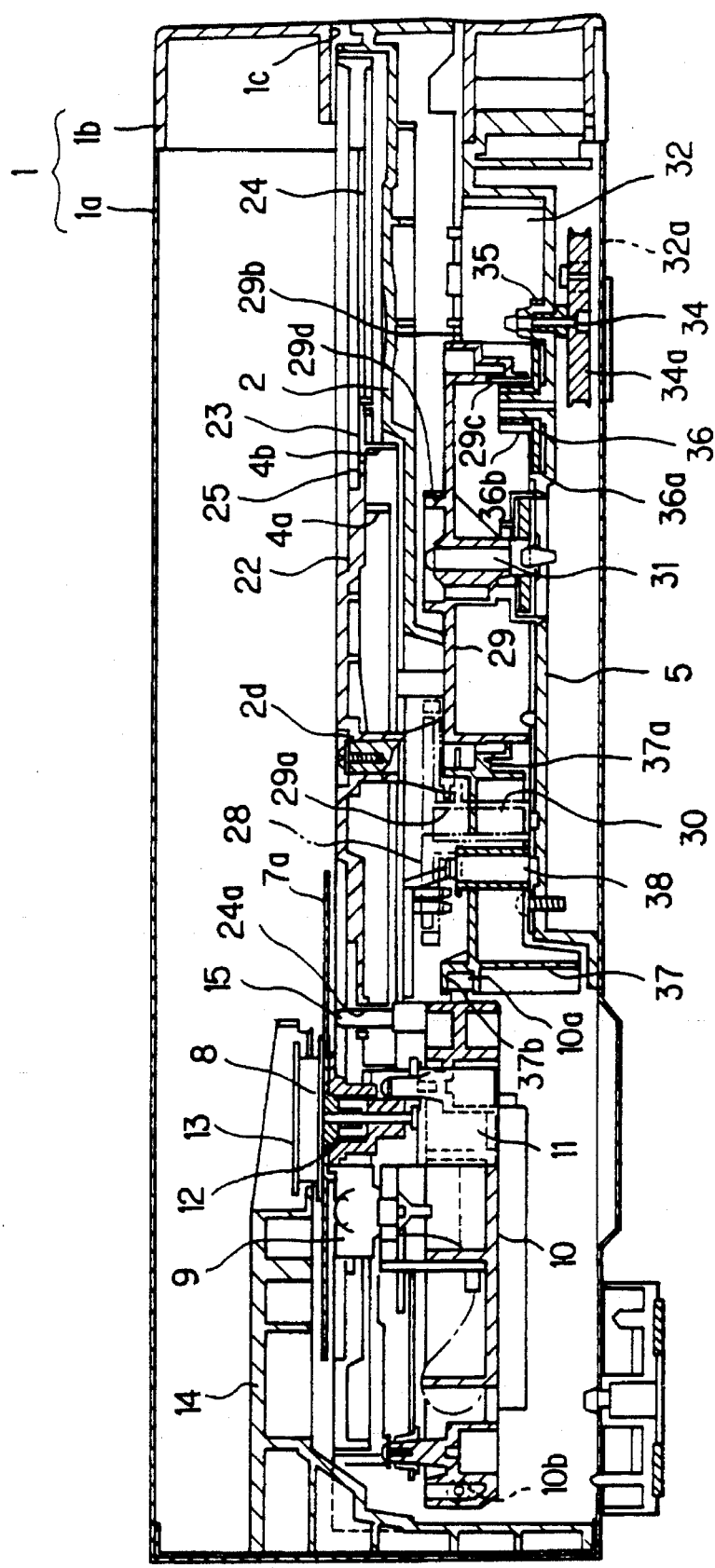
FIG. 3 is a longitudinal sectional view of the disc player shown in FIG. 1, showing a disc clamping state.
Figure 4:
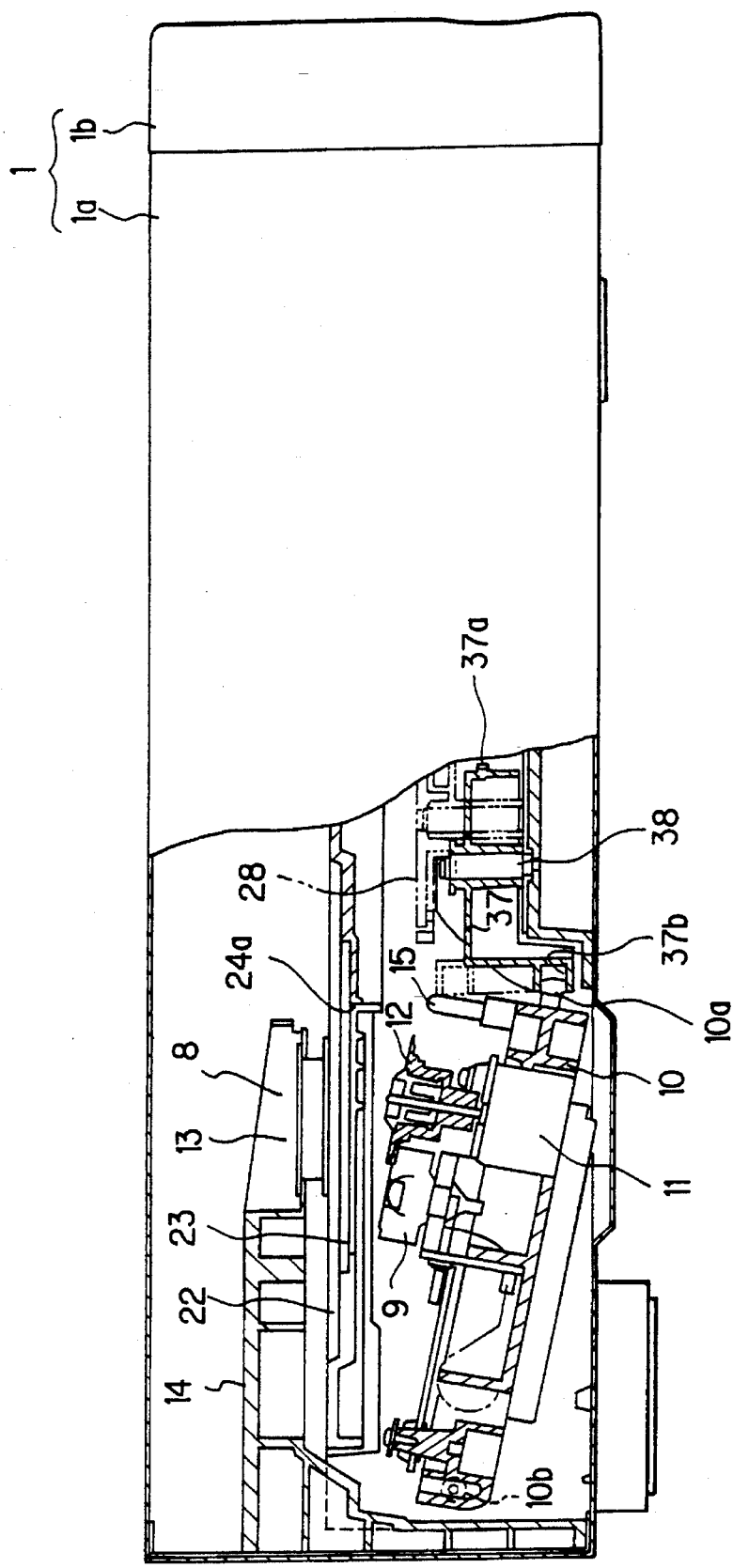
FIG. 4 is a longitudinal fragmentary view showing a primary part, shown in FIG. 3 and kept under a disc clamping release state.
Figure 5:
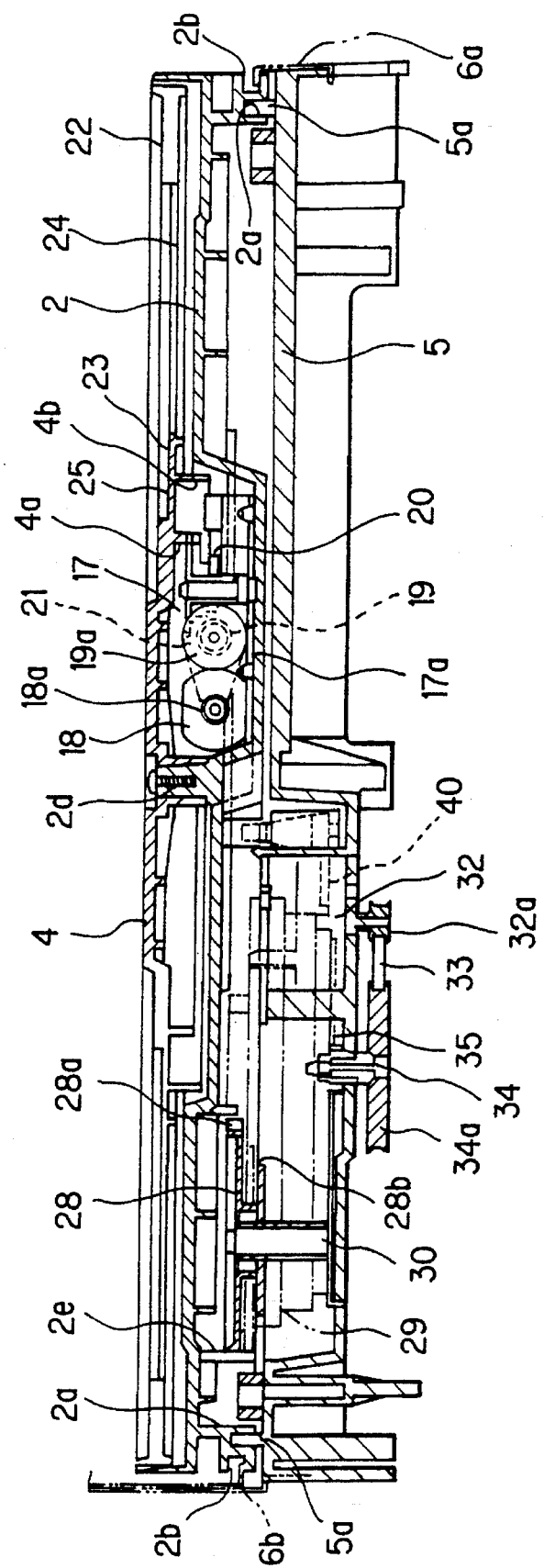
FIG. 5 is a cross-sectional view showing a state where the outer casing has been removed from the disc player shown in FIG. 1.

As shown in FIGS. 3 through 5, a base member 5 having substantially the same size as that of the disc tray 2 is mounted on a bottom surface portion of the box-shaped body 1a of the outer casing 1. Formed on both sides of the lower surface of the disc tray 2 are a pair of guide grooves 2a each of which extends back and forth. Guide projections 5a which are engaged with the guide grooves 2a are formed on the upper surface of the base member 5. By the engagement of the pair of the guide grooves 2a and the guide projections 5a, the disc tray 2 is linearly movable back and forth relative to the base member 5. Retainer pieces 6a and 6b which are mounted on the base member 5 are engaged with a pair of lateral grooves 2b formed in side walls of the disc tray 2 to thereby prevent any lift of the disc tray 2 when the disc tray 2 is ejected.

Disposed on a rear portion of the box-shaped body 1a in a rearward direction in which the disc tray 2 is retracted are a rotary drive mechanism 8 for holding and rotationally driving optical discs 7a and/or 7b and an optical pickup 9 which is a pickup device facing the optical discs 7a, 7b (FIG. 1) to be rotationally driven by the rotary drive mechanism 8 for reading information signals from the optical discs 7a, 7b. A substantially rectangular cutaway portion 2c (FIG. 6) is formed in the rear portion of the disc tray 2. A swing member 10 is disposed in the cutaway portion 2c. A pair of pivot shafts 10b project from both sides of the swing member 10, respectively. The pivot shafts 10b are rotatably engaged with both sides of the cutaway portion 2c so that the swing member 10 is pivotally mounted to be swingable up and down relative to the base member 5.

The rotary drive mechanism 8 is composed of a spindle motor 11, a disc table 12 mounted on a drive shaft of the spindle motor 11, a chucking plate 13 for clamping the optical disc 7a, 7b in cooperation with the disc table 12. The spindle motor 11 is mounted at a front edge side of the swing member 10 with its drive shaft directed upwardly. A substantially conical projection is formed on the central portion of the upper surface of the disc table for centering and holding the optical disc 7a, 7b. The chucking plate 13 is rotatably supported by an arm bracket 14 so as to face the upper surface of the disc table 12. The arm bracket 14 has substantially an L-shape in longitudinal section. One arm of the arm bracket 14 is fixed to a rear wall of the box-shaped body 1a and the other arm is extended in the horizontal direction. The chucking plate 13 is floatingly supported at a distal end of the horizontal arm.

The optical pickup 9 is composed of a light source such as a laser diode, an optical block incorporating therein a predetermined optical device such as a beam splitter and a collimator lens and an optical detector such as a photodiode, and an actuator mounted on a top portion of the optical block. The actuator supports an objective lens to be movable for converging a flux of light, emitted from the optical block, onto a signal recorded surface of the optical disc 7a, 7b. The optical pickup 9 is supported on a guide shaft 16 (FIGS. 6 and 7) mounted on the top surface of the swing member 10 and is disposed on the rear side of the disc table 12 to be movable back and forth in a direction away from the disc table 12. The objective lens of the optical pickup 9 is directed upwardly, and an optical axis of the objective lens is substantially parallel to the drive shaft of the spindle motor 11.

Figure 2:
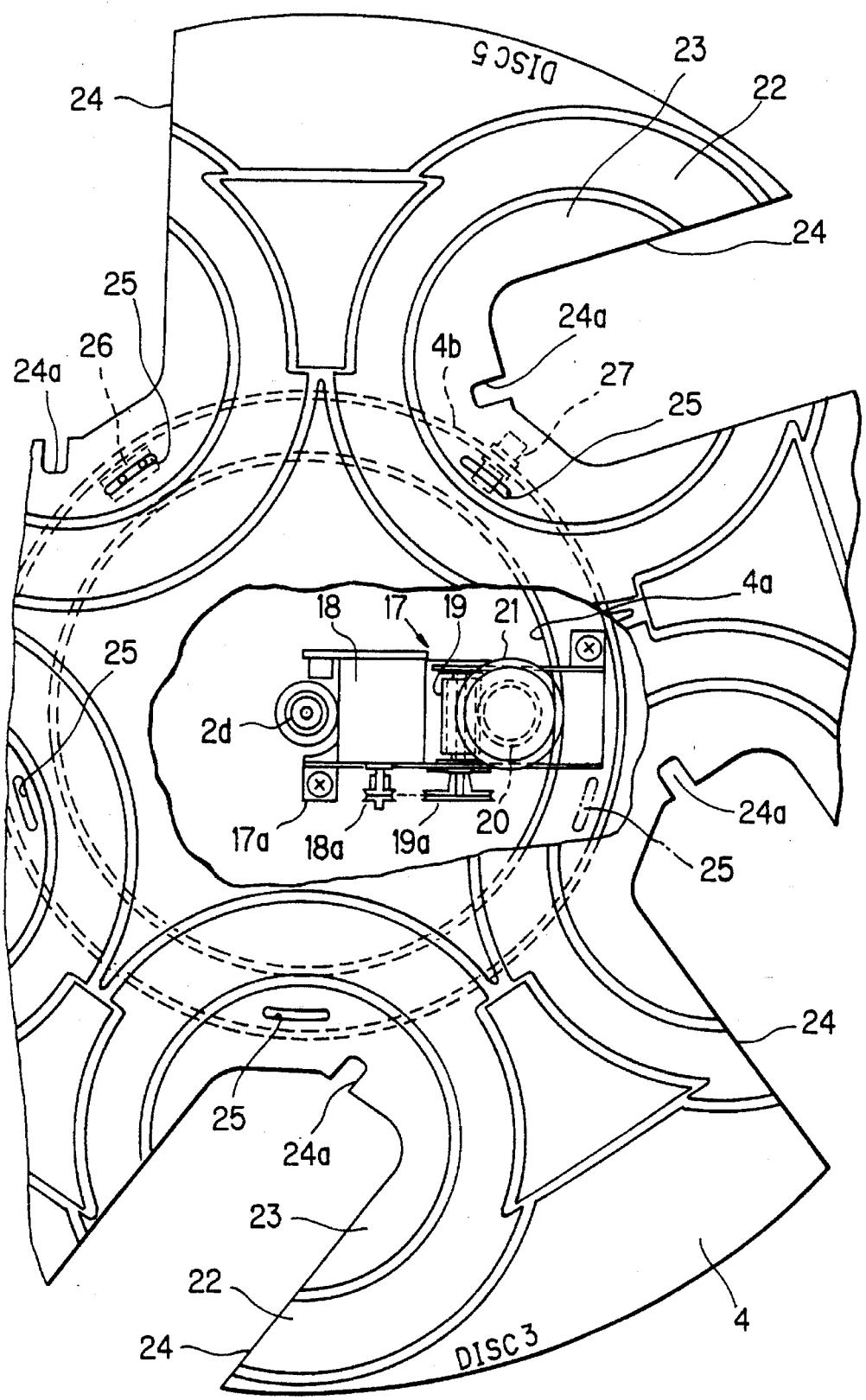
FIG. 2 is a plan view showing a primary part of the turntable of the disc player and its table rotating mechanism shown in FIG. 1.

Disposed on the upper surface side of the disc tray 2 is a turntable 4 for positioning and receiving a plurality of kinds of optical discs 7a and 7b having different diameters. The turntable 4 is formed in a disk-like shape having a thickness smaller than that of the disc tray 2 and is accommodated in a circular recess formed in the top surface portion of the disc tray 2. Then, the turntable is rotatably supported about a central shaft 2d provided on a central portion of the disc tray 2 to be rotatable relative to the disc tray 2. For this reason, as best shown in FIG. 2, an inner gear portion 4a is formed radially inwardly of the turntable 4 over an entire circumferential direction of the turntable 4. A table rotating mechanism 17 is disposed adjacent to the central shaft 2d of the disc tray 2 for rotationally driving the turntable 4 through the inner gear portion 4a.

The table rotating mechanism 17, as shown in FIGS. 2 and 5, is composed of a table rotating motor 18 having a drive shaft on which a drive pulley 18a is mounted, a worm gear 19 having one end on which mounted a driven pulley 19a drivably connected to the drive pulley 18a by a drive belt, a pinion 20 engaged with the worm gear 19, and a table rotating gear 21 rotationally driven together with the pinion 20 and engaged with the inner gear portion 4a of the turntable 4. The table rotating motor 18, the worm gear 19, the pinion 20 and the table rotating gear 21 are fixedly or rotatably supported by a unit plate 17a. The table rotating mechanism 17 is mounted on the disc tray 2 through the unit plate 17a.

For example, the optical discs 7a and 7b are directed to a large size optical audio disc having a diameter of 12 (cm) and a small size optical audio disc having a diameter of 8 (cm), respectively. In order to position and load the optical discs 7a and 7b, as shown in FIGS. 1 and 2, on the top surface of the turntable 4, a plurality of large diameter recess portions 22 for positioning large diameter discs corresponding to the diameter of the large size optical disc 7a are formed and arranged at a predetermined interval in the circumferential direction on the same circle. Furthermore, small diameter recess portions 23 for positioning the small size discs corresponding to the small diameter optical disc 7b are formed coaxially on bottom portions of the respective large diameter recess portions 22.

In connection with each large diameter recess portion 22 and small diameter recess portion 23, a slot or cutout portion 24 is formed in the turntable 4 so that the disc table 12 faces the central portion of the optical disc 7a, 7b positioned by the large diameter recess portion 22 or small diameter recess portion 23 for positioning the discs, and in the same way, the actuator of the optical pickup 9 faces the signal recorded surface of the optical disc 7a, 7b. Each slot 24 extends from the central portion of the large diameter recess portion 22 and small diameter recess portion 23 up to the circumferential edge portion of the turntable 4 in the direction of retraction and ejection of the disc tray 2, i.e., in the back-and-forth direction of the disc player when the central portion of each large diameter recess portion 22 and small diameter recess portion 23 is angularly shifted upwardly of the rotary drive mechanism 8.

Also, a slit 24a is formed in an inward end portion of each slot 24 for preventing the rotation of the turntable 4. A stopper 15 (FIGS. 6 and 7) formed at the swing side tip end of the swing member 10 is detachably engaged with the slit 24a. Namely, when the turntable 4 is in a predetermined position and the swing member 10 is raised under the disc chucking condition, the stopper 15 is engaged in the slit 24a whereby the rotation of the turntable 4 is prevented. Incidentally, a predetermined address is allotted in advance to the disc receiving recess portion by every combination. According to this embodiment, addresses 1 to 5 are allotted to the disc receiving recess portions.

In order to carry out the position controlling operation of the turntable or the like, a disc detecting optical sensor 26 for detecting the presence and absence of the optical discs 7a and 7b and an address detecting optical sensor 27 for detecting the address allotted on each combination of the large diameter recess portion 22 and small diameter recess portion 23 are provided.

The disc detecting optical sensor 26 is provided for detecting whether or not the optical disc 7a or 7b is present on any one of the large diameter recess portions 22 or small diameter recess portions 23 of the turntable 4. In this connection, disc detection through-holes 25 are formed at an equal interval about the central shaft 2d within the respective small diameter recess portions 23 of the turntable 4. The disc detecting optical sensor 26 is provided at a position below the disc detection through-hole 25 on the disc tray 2. The optical sensor 26 is adapted to detect the optical disc 7a, 7b, laid on the position in confronted relation, and to output a detection signal through any one of disc detection through-holes 25 when the turntable 4 is located at a predetermined angular position.

The disc detecting optical sensor 26 has a light emitting element such as an LED (light emitting diode) and a light receiving element such as a PD (photo diode) so that the reflective light by the object to be detected with a flux of light emitted from the light emitting element is detected by the light receiving element. The optical sensor 26 detects the presence of the large diameter optical disc 7a laid within the large diameter recess portion 22 or the small diameter optical disc 7b laid within the small diameter recess portion 23 through the disc detection through-hole 25 when the turntable takes the predetermined angular position, i.e., when the disc receiving recess portion is located above the optical pickup 9.

As shown in FIGS. 5 through 8, a rack portion 2e extending from the front side to the rear side is formed in the disc tray 2. Engaged with this rack portion 2e is a rack side gear 28a provided in a reverse gear 28. A rack side gear 29a provided in a main gear 29 is normally disengaged from the rack portion 2e and is engaged with the rack portion 2e after the main gear 29 has rotated through a predetermined angle.

Figure 17:
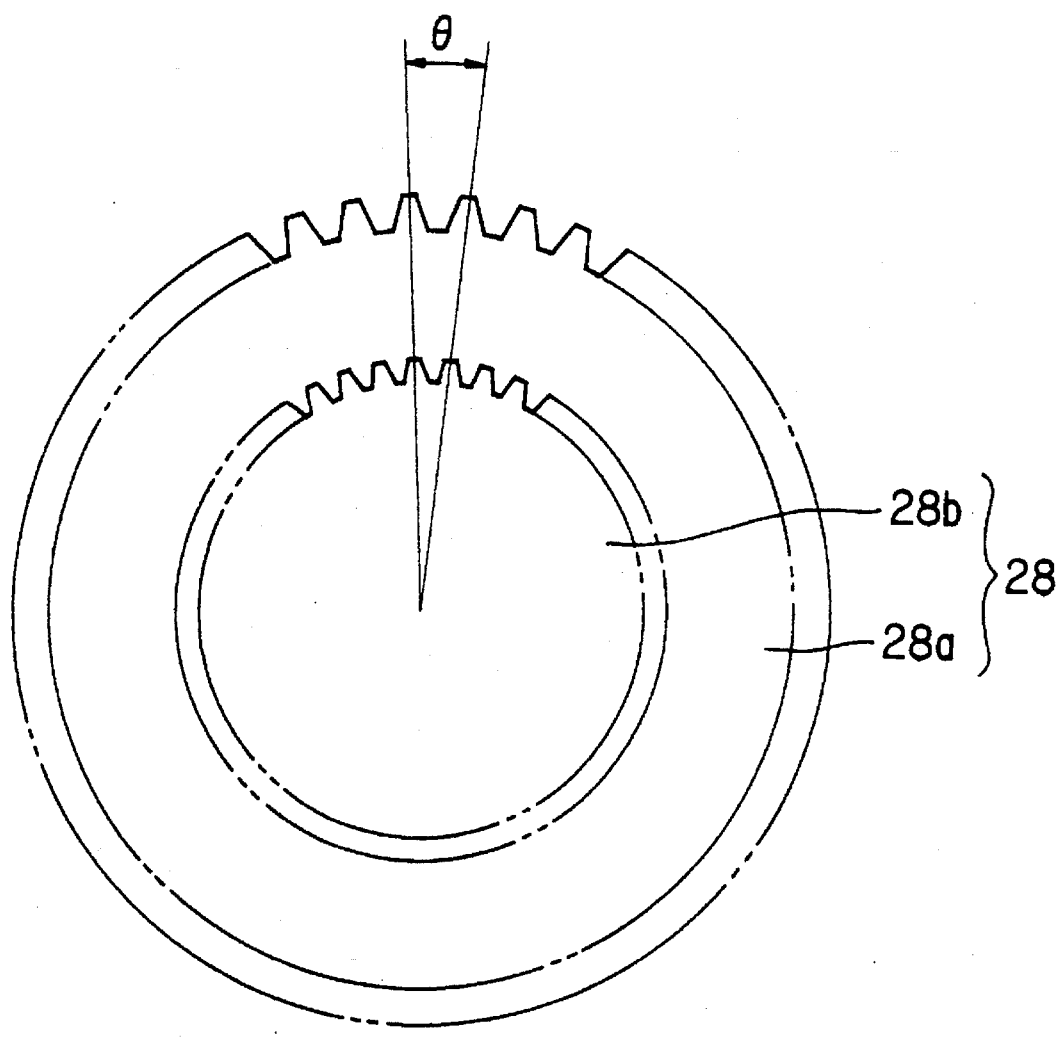
FIG. 17 is an enlarged plan view showing a reverse gear of the disc player shown in FIG. 1.

As shown on an enlarged scale in FIG. 17, the reverse gear 28 is provided with an input side gear 28b spaced in the axial direction away from the rack side gear 28a. The input side gear 28b has a pitch circle that is different from that of the rack side gear 28a but has the same angle θ per one gear tooth (i.e., the same number of gear teeth) as that of the rack side gear 28a. In order to keep the angle θ per one gear tooth the same, a module of the input side gear 28b is made small by reducing a size of each tooth. A reverse side gear 29b provided in the main gear 29 is normally disengaged but engagable with the input side gear 28b of the reverse gear 28 after the reverse side gear 29b has rotated through a predetermined angle.

The reverse gear 28 is rotatably supported on the base member 5 by a reverse gear pivot shaft 30, whereas the main gear 29 is rotatably supported also on the base member 5 by a main gear pivot shaft 31. The main gear 29 is provided over its entire inner circumference with an inner gear portion 29c and is drivable through a gear train mechanism, engaging with the inner gear portion 29c and connected to a loading motor 32 that is a single drive source.

The loading motor 32 is mounted on the base member 5 with its drive shaft being directed downwardly. A drive pulley 32a is mounted on the drive shaft. A drive belt 33 is laid on one side around the drive pulley 32a and on the other side around a driven pulley 34a mounted on one end of a pivot shaft 34 pivoted on the base member 5. An input gear 35 is mounted on the other end of the pivot shaft 34. The input gear 35, the pivot shaft 34 and the driven pulley 34a are rotationally driven together. An input gear portion 36a of an intermediate gear 36 pivoted on the base member 5 is engaged with the input gear 35. An output gear portion 36b formed integrally with the input gear portion 36a is engaged with the inner gear portion 29c of the main gear 29.

On a top surface of the main gear 29, there are formed an inner cam portion 29d formed substantially in a circle about the main gear pivot shaft 31 and an outer cam portion 29e having a substantially arcuate shape formed on the front side of the casing 1 at a predetermined interval in concentric relation with a part of the inner cam portion 29d. A cam projection portion 2f projecting from a bottom surface of the disc tray 2 is insertable between the inner cam portion 29d and the outer cam portion 29e. The cam projection portion 2f extends in a direction where the tray is retracted or projected. Under the condition that the disc tray 2 is completely received into the casing 1, the cam projection portion 2f is interposed between the inner cam portion 29d and the outer cam portion 29e to thereby prevent the disc tray 2 from being drawn to the outside. On the other hand, when the main gear 29 is rotated through a predetermined angle, the main gear 29 is angularly moved so that the outer cam portion 29e is separated away from the cam projection portion 2f, whereby the withdrawal of the disc tray 2 is possible.

Furthermore, an up-and-down side gear 29f which is engageable with a gear portion 37a of an up-and-down member 37 is provided in the main gear 29. The up-and-down member 37 is rotatably supported on an up-and-down pivot shaft 38 mounted on the base member 5. The up-and-down member 37 has a slanted sliding portion 37b which is to be slidably engaged with a guide projection 10a formed at the swing side tip end of the swing member 10. The slanted sliding member 37b is formed opposite the gear portion 37a. Incidentally, both end teeth 37d located at both ends of the gear portion 37a have a height greater than that of the other teeth whereby the engagement with the up-and-down side gear 29f of the main gear is improved.

Also, the slanted sliding portion 37b is spirally formed about the up-and-down pivot shaft 38 so that the swing member 10 is held substantially horizontally as shown in FIG. 3 when the guide projection 10a is located on the topmost position of the slanted sliding portion 37b. Under this condition, the optical disc 7a is chucked by the rotary drive mechanism 8. On the other hand, when the guide projection 10a is lowered so that it is located at the lowermost position of the slanted sliding portion 37b, as shown in FIG. 4, the swing member 10 is swung obliquely downwardly about the shaft portions 10b projecting from opposite rear sides of the swing member 10. Under this condition, the optical disc 7a is released from the rotary drive mechanism 8.

The swing member 10 suffices if it is swung in the above-noted rotary range of the slanted sliding portion 37b and has to be fixed out of this range. For this reason, the number of gear teeth which are needed for moving the guide projection 10a from the topmost end to the lowermost end of the slanted sliding portion 37b is provided to each of the gear portion 37a of the up-and-down member 37 and the up-and-down side gear 29f of the main gear 29 which is engaged with the gear portion 37a. A cylindrical surface 29g is provided on the main gear 29 except for the up-and-down side gear 29f. Arcuate surfaces 37c that are to come into sliding contact with the cylindrical surface 29g are formed on both sides of the gear portion 37a. By using these arcuate surfaces 37c and the cylindrical surface 29g, a rotation preventing mechanism is effected for the up-and-down member 37.

Figure 6:
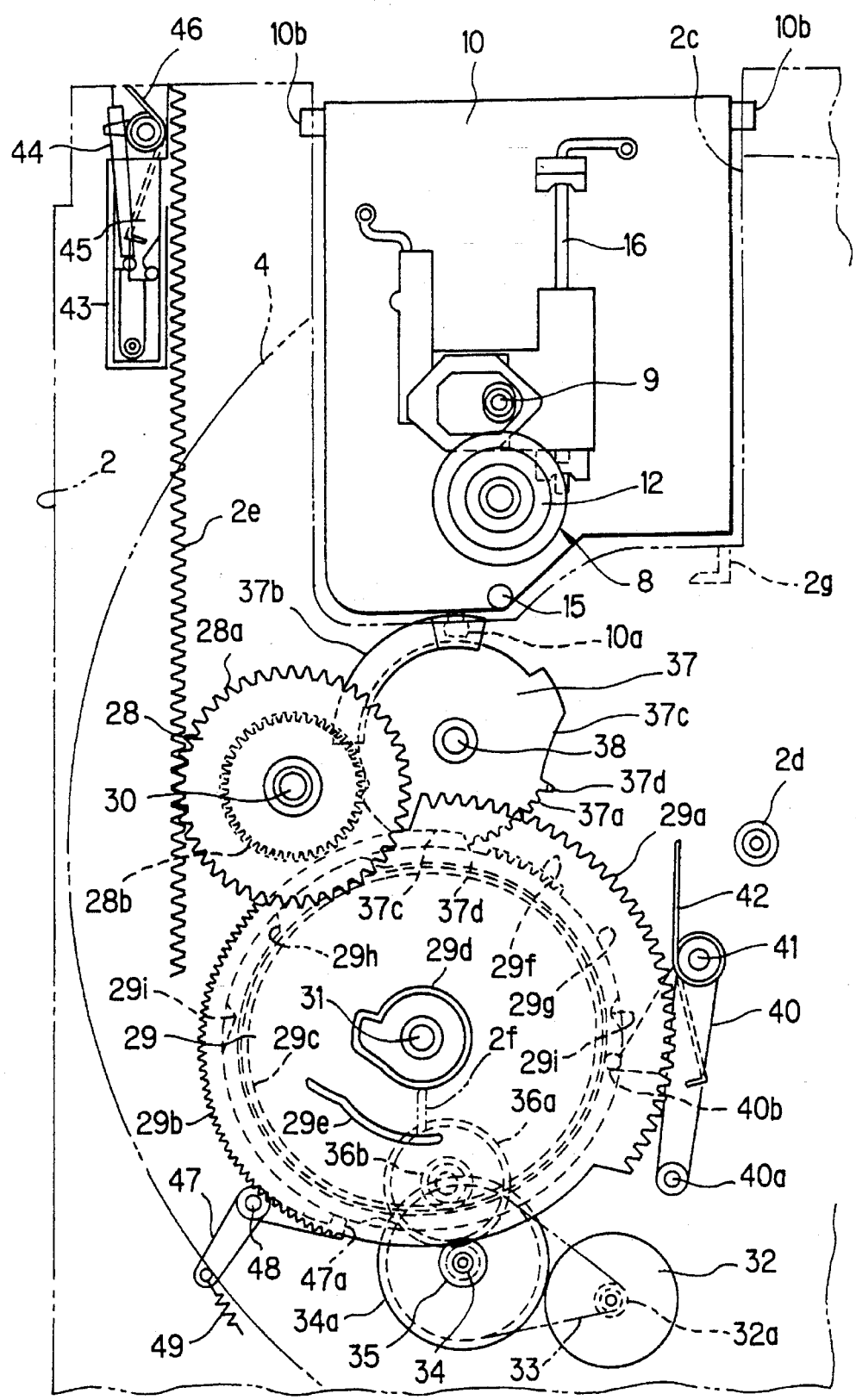
FIG. 6 is an illustration of a loading mechanism under a loading condition of the disc player shown in FIG. 1.

A lock lever 40 is shown in FIGS. 5 and 6. One end of the lock lever 40 is mounted swingably onto the base member 5 by a support shaft 41 and the other end thereof is provided with a stopper portion 40a and extends toward the opening 1c of the front panel 1b. A cam input portion 40b projecting toward the main gear 29 is formed in an intermediate portion of the lock lever 40 and is brought into contact with an outer circumferential surface of the main gear 29. Reference numeral 42 denotes a spring for biasing the lock lever 40 so that the cam input portion 40b is depressed against the main gear 29.

Figure 8:
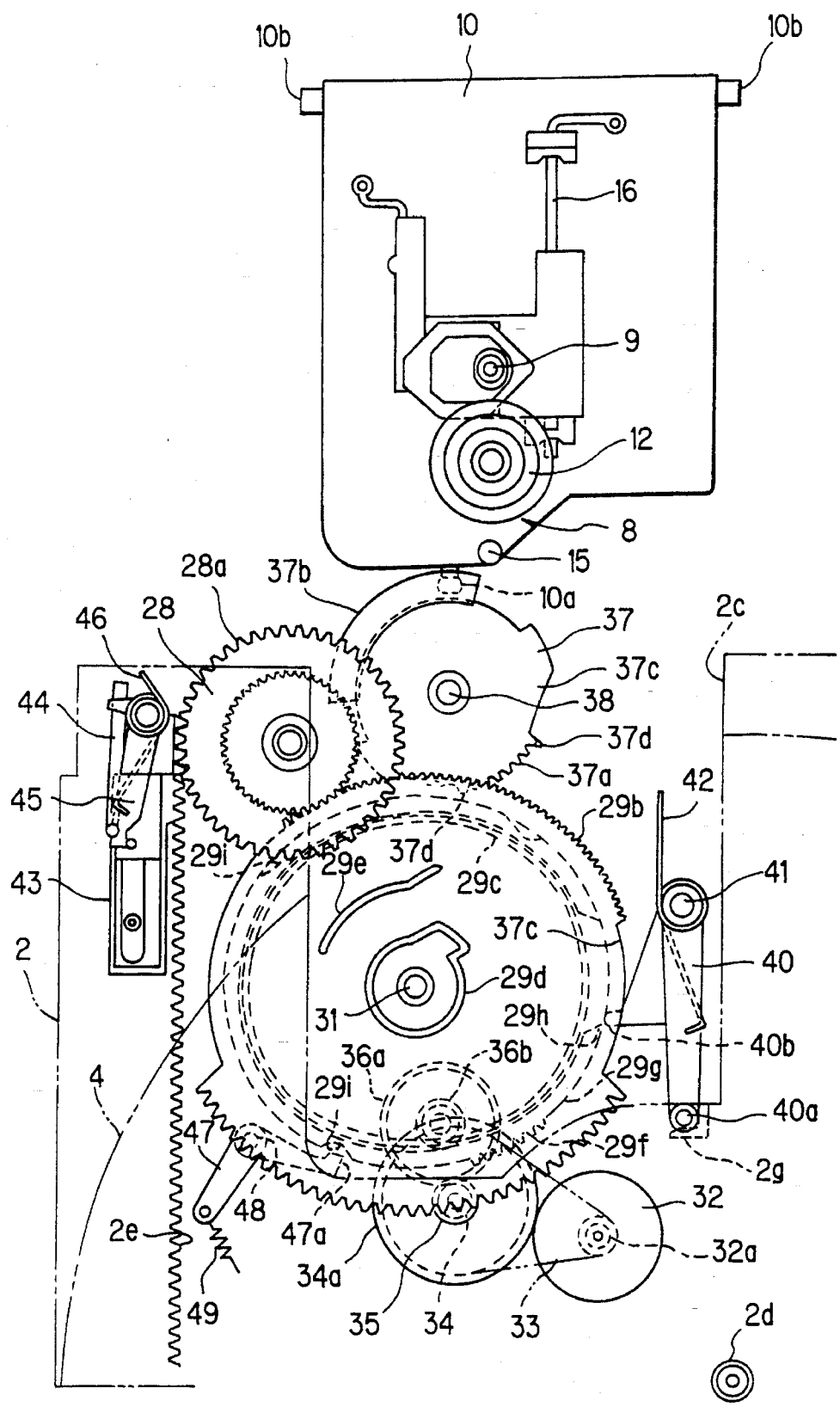
FIG. 8 is an illustration showing the loading mechanism under the state where the disc tray has been withdrawn during playback.

On the outer circumferential surface of the main gear 29, there is provided a cam portion 29h for depressing the cam input portion 40b and projecting the stopper portion 40a at the end of the lock lever 40 on a movement path of the disc tray 2 when any one of the disc receiving positions of the turntable 4 has been angularly shifted from a position corresponding to the optical pickup 9 upon unloading. For this purpose, a stopper receiving portion 2g having an L-shape is formed on the lower surface of the disc tray 2, and as shown in FIG. 8, the stopper receiving portion 2g is engaged with the stopper portion 40a to thereby prevent the disc tray 2 from being inserted when the lock lever 40 has been projected by the cam portion 29h. The lock mechanism for preventing the loading operation for the disc change during playback is constituted by the lock lever 40, the cam portion 29h of the main gear 29 and the stopper receiving portion 2g of the disc tray 2.

In order to insure the operation of the lock mechanism, a lock operating mechanism is provided in association with the reverse gear 28 and the rack portion 2e. The lock operating mechanism includes a slide gear 43 which has the same rack as that of the rack portion 2e and which slide gear is mounted slidably back and forth on the base member 5 so that a part of the rack of the slide gear is overlapped with the end portion of the rack portion 43; a return spring 44 for biasing the slide gear 43 rearwardly; a resistance lever 45 engaged with a projection formed on the slide gear 43 for preventing the slide gear 43 from moving back and forth in the initial condition; and a return spring 46 for biasing the resistance lever 45 toward the projection to generate a resistance. The lock operating mechanism is provided for carrying out the operation for moving the disc tray 2 forwardly by the rotational force of the reverse gear 28 during playback, and the operation for rotating the main gear 29 and swinging the lock lever 40 under the condition that the movement of the disc tray 2 is stopped.

In FIG. 8, therefore, when the main gear 29 is rotated counterclockwise, the cam portion 29h is in abutment with the cam input portion 40b from the side of the opening 1c, and the stopper portion 40a at the other end is attracted toward the main gear 29. Thus, the stopper portion 40a is out of the movement path of the stopper receiving portion 2g, and at this time, the disc receiving position is substantially the same as the optical pickup 9. Accordingly, it is possible to manually depress or withdraw the disc tray 2. On the other hand, when the main gear 29 is rotated clockwise and the cam portion 29h is brought into contact with the cam input portion 40b to push the latter, the stopper portion 40a at the other end is released from the main gear 29. As a result, the stopper portion 40a is moved on the movement path of the stopper receiving portion 2g. Accordingly, it is impossible to perform the depression of the disc tray 2.

Figure 7:
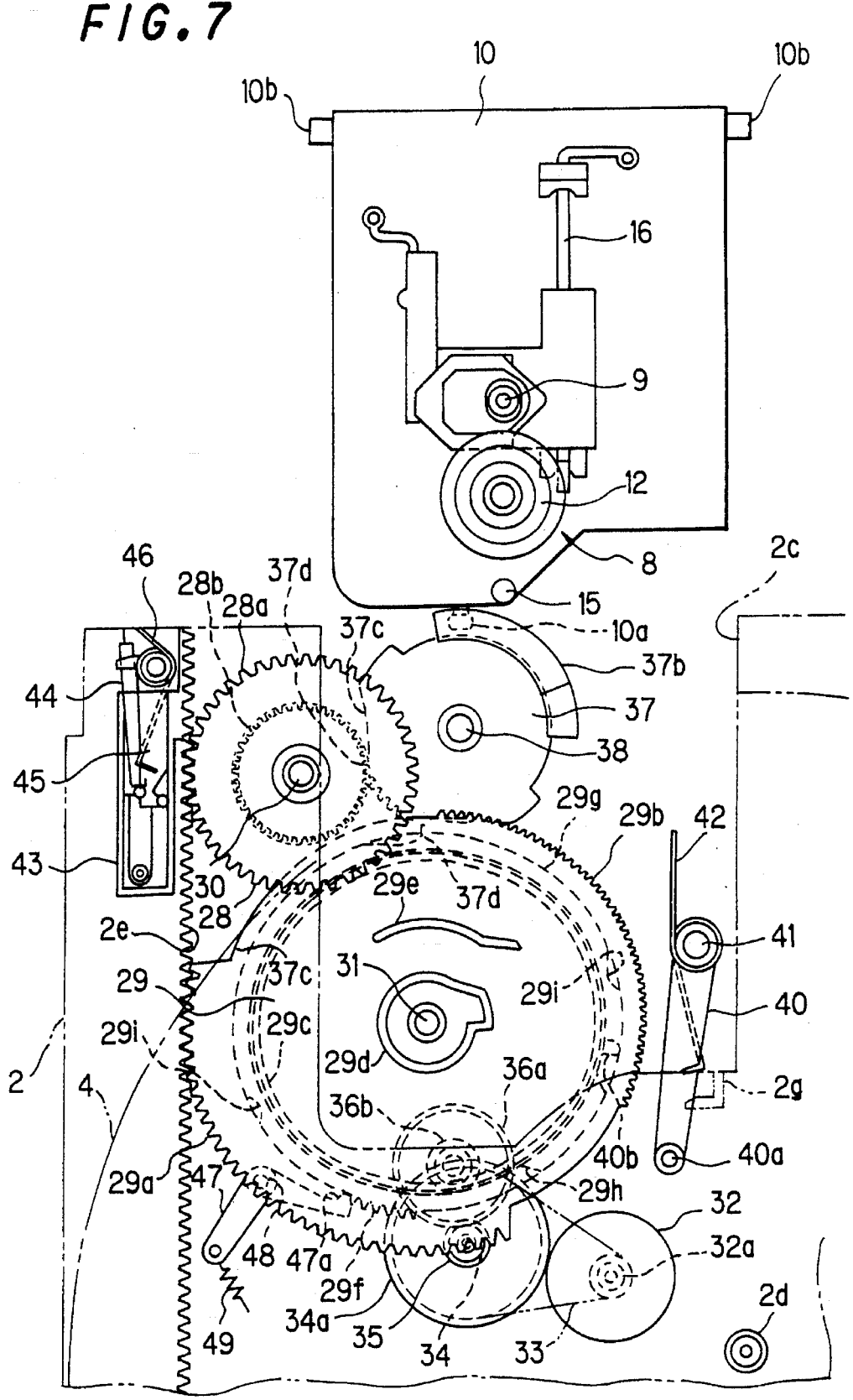
FIG. 7 is an illustration of the loading mechanism under the condition where the disc tray has been withdrawn from the normal loading condition.

Also, as shown in FIGS. 6 to 8, a set lever 47 is pivotally supported on the base member 5 by a support shaft 48. The set lever 47 is used to engage the main gear 29 and to prevent the rotation of the main gear 29 when the main gear 29 is disengaged from the rack portion 2e to form a neutral point in the normal loading operation. An engagement projection 47a is formed at one end of the set lever 47 and is brought into contact with the main gear 29 by a spring 49 that pulls the other end of the set lever 47. Three projection receiving portions 29i that are recessed in a V-shape are formed in the main gear 29.

A first gear train is formed by the rack side gear 29a of the main gear 29 and the rack portion 2e of the disc tray 2. A first operating mechanism is formed by the first gear train and the up-and-down member 37. A second gear train is formed by the reverse side gear 29b of the main gear 29, the reverse gear 28 and the rack portion 2e. A second operating mechanism is formed by the second gear train.

The disc player is provided with a memory means such as a ROM to be described later. Inputted into the controller are various input signals from the disc detection sensor 26, the address detecting sensor 27, the operating button 3b, the skip button 3c and other devices. On the basis of these input signals, the controller outputs control signals to the table rotating motor 18, the loading motor 32 and the like to thereby perform the loading operation, the playback and the like as described later.

In the thus constructed disc player in accordance with the invention, in the case where the large diameter optical disc 7a received in the large diameter recess portion 22 of the turntable is reproduced or the small diameter optical disc 7b received in the small diameter recess portion 23 is reproduced, it is possible to selectively perform the "normal loading operation" and the "loading operation during playback". The normal loading operation means that before playback the optical disc 7a or 7b is set in the large diameter portion 22 or small diameter portion 23 of the turntable 4 to bring about a reproducible condition. The loading operation during loading means that the optical disc 7a or 7b is set on any large diameter recess portion 22 or small diameter recess portion 23 during the playback or the optical disc 7a or 7b which has been set in advance is brought into the reproducible condition by changing the disc by another optical disc.

Figure 9:
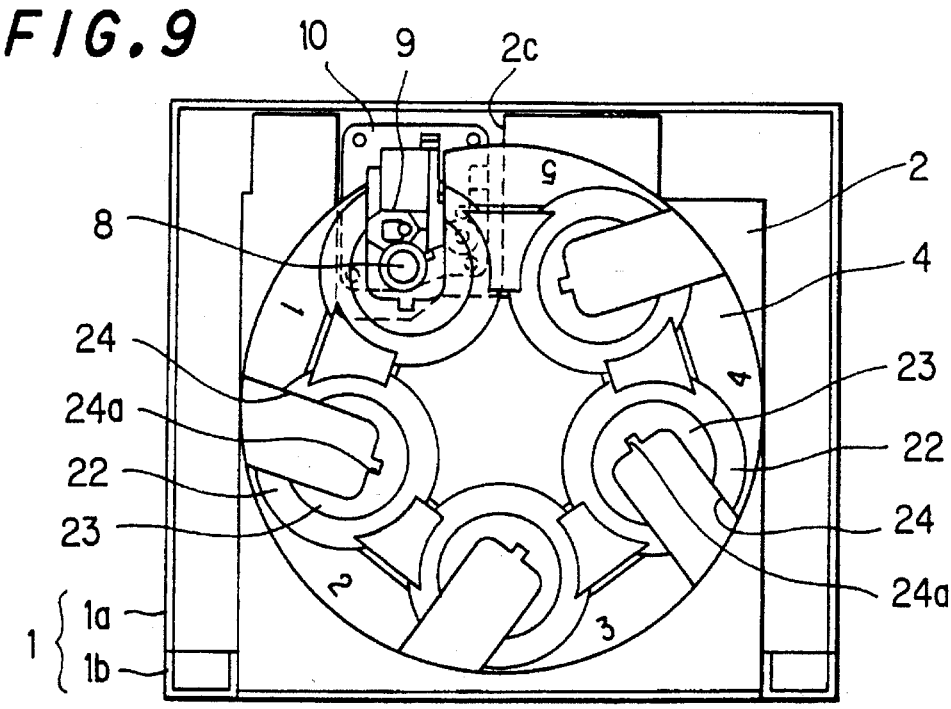
FIG. 9 is a schematic view showing the loading condition of the disc player shown in FIG. 1.
Figure 10:
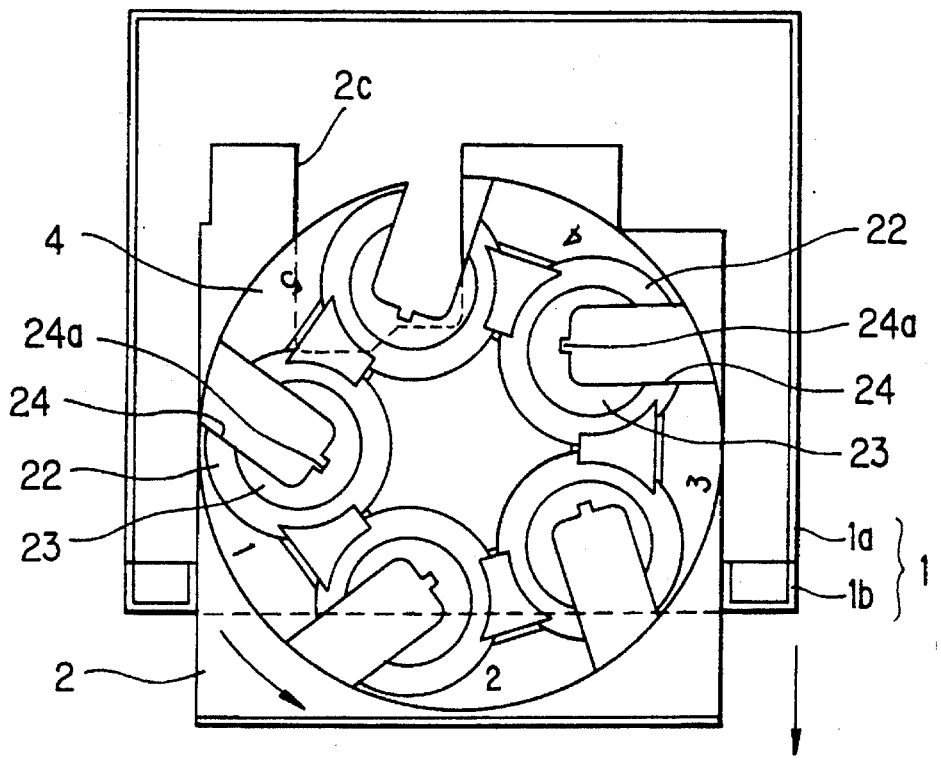
FIG. 10 is a schematic view showing a state where the disc tray is somewhat withdrawn from the state shown in FIG. 9.
Figure 11:
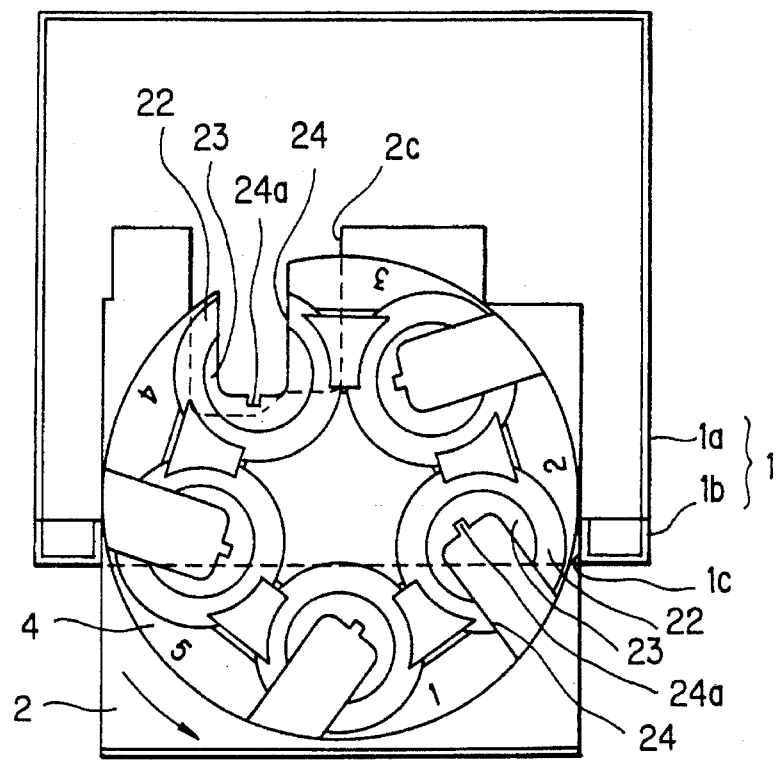
FIG. 11 is a schematic view showing a state where the disc tray is further withdrawn from the state shown in FIG. 10.

As shown in FIGS. 6 and 7 and 9 through 12, the normal loading operation is performed by the following operations. Incidentally, FIG. 6 shows a loading condition where the disc tray 2 is completely received in the casing 1. FIG. 9 schematically shows this condition. FIG. 7 shows an unloading condition where the disc tray 2 is completely drawn from the normal loading condition. FIG. 11 schematically shows this condition.

First of all, the power source button 3a on the front panel 1b is turned on. After the electric power has been supplied to the subject disc player, the operating button 3b is turned on. As a result, the electric power is supplied to the loading motor 32 through the operation of the controller. The rotational torque is transmitted from the drive pulley 32a through the drive belt 33 to the driven pulley 34a and is further transmitted from the input gear 35, formed integrally with the driven pulley 34a, through the input gear 36a and the output gear 36b of the intermediate gear 36 to the inner gear portion 29c and finally to the main gear 29.

As a result, the main gear 29 is rotationally driven counterclockwise in FIG. 6. First of all, the up-and-down side gear 29f of the main gear 29 is engaged with the gear portion 37a of the up-and-down member 37, so that the up-and-down member 37 is rotated, clockwise in FIG. 6, corresponding to the number of its gear teeth. As a result, the guide projection 10a of the swing member 10 is moved from the topmost portion (in a state shown in FIG. 3) to the lowermost portion (in a state shown in FIG. 4) by the guidance of the slanted sliding portion 37b of the up-and-down member 37. Thus, since the swing member 10 is swung forwardly about the shaft portions 10b, the optical pickup 9 laid on the swing member 10 is lowered, and at the same time, the disc table 12 of the rotary drive mechanism 8 is separated away from the chucking plate 13 so that the clamping operation for the optical disc 7a is released.

When the swing member 10 is lowered to the lowermost end, the engagement between the up-and-down side gear 29f and the gear portion 37a is released, and the cylindrical surface 29g of the main gear 29 is brought into sliding contact with the arcuate surface 37c of the up-and-down member 37. For this reason, the main gear 29 continues to rotate onward, whereas the up-and-down member 37 is prevented from rotating by the main gear 29 to hold the swing member 10 fixedly to the lowermost position. Then, when the main gear 29 has rotated through a predetermined angle, the rack side gear 29a is engaged with rack portion 2e of the disc tray 2 whereby the disc tray 2 is moved forwardly.

In this case, when the swing member 10 is lowered, the stopper 15 projected from the tip end portion of the swing member 10 is released downwardly from the slit 24a provided in the bottom of the cutaway groove 24 of the turntable 4. At the same time, the table rotating motor 18 is rotationally driven, and the rotational torque of its drive shaft is transmitted from the drive pulley 18a through the drive belt to the driven pulley 19a and is further transmitted from the worm gear 19, integral with the driven pulley 19a in the rotational direction, to the pinion 20 engaged with the worm 19. Since the table rotating gear 21 is mounted fixedly on the pinion 20, the turntable 4 is rotationally driven counterclockwise (FIG. 10) through the inner gear portion 4a engaged with the table rotating gear 21.

The rotational amount of the turntable 4 is detected by the disc detecting sensor 26 and the address detecting sensor 27. Since the controller outputs control signals on the basis of the detection signals, when, as shown in FIG. 11, the turntable 4 has rotated through a predetermined angle to reach the address 1 through two positions, the rotation of the turntable 4 is stopped. Thus, the disc player is kept under the unloading condition and the loading of the optical disc 7a or 7b on the address 1 is possible.

Thus, in the case where one optical disc 7a or 7b is loaded on the turntable 4 and is to be reproduced, the operating button 3b is turned on for the loading condition. This operation is opposite to the above-described loading operation.

Figure 12:
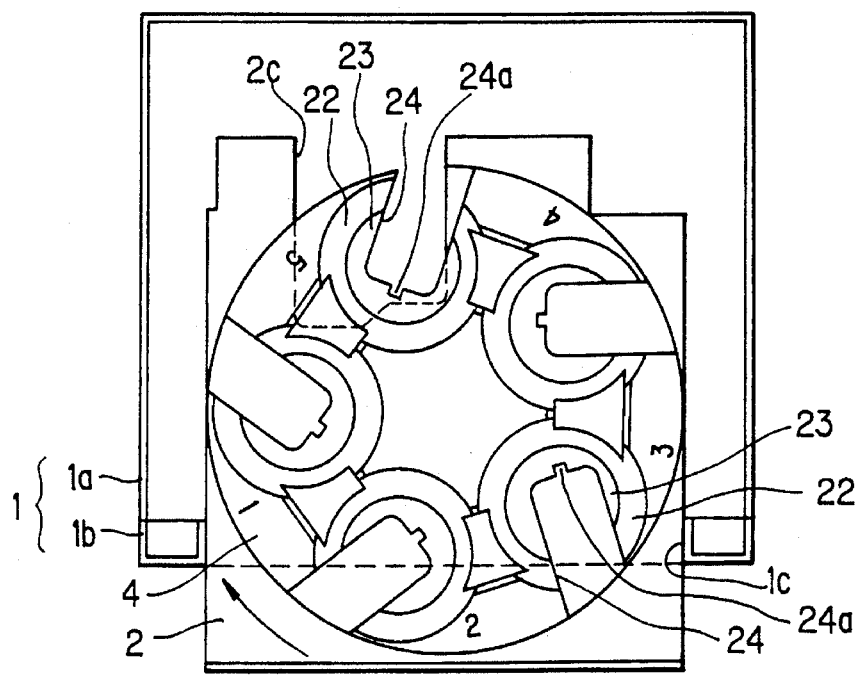
FIG. 12 is a schematic view showing a state where the disc tray is somewhat withdrawn from the state shown in FIG. 11.

Namely, when the operating button 3b is turned on, the loading motor 32 is rotated through the operation of the controller in the opposite direction to that described above. The main gear 29 is rotationally driven clockwise. The rotational torque of the main gear 29 is transmitted from the rack portion 2e to the disc tray 2. The disc tray 2 and the turntable 4 is shifted from the condition where the tray and turntable are largely drawn as shown in FIG. 11 to the condition where the tray and turntable are almost half drawn as shown in FIG. 12. Then, the up-and-down side gear 29f of the main gear 29 is engaged with the gear portion 37a of the up-and-down member 37 and the up-and-down member 37 is rotated counterclockwise.

At the same time, the table rotating motor 18 is rotated in the reverse direction to rotate the turntable 4 by the two positions in the reverse direction up to the position where the address 1 corresponds to the initial position opposed to the optical pickup 9. Thus, as shown in FIG. 3, the swing member 10 is raised by the action of the slanted sliding member 37b, and the optical disc 7a is clamped by the rotary drive mechanism 8. At the same time, the optical pickup 9 opposes the information recorded surface of the optical disc 7a. Thus, the loading operation of the subject disc player is completed.

Figure 13:
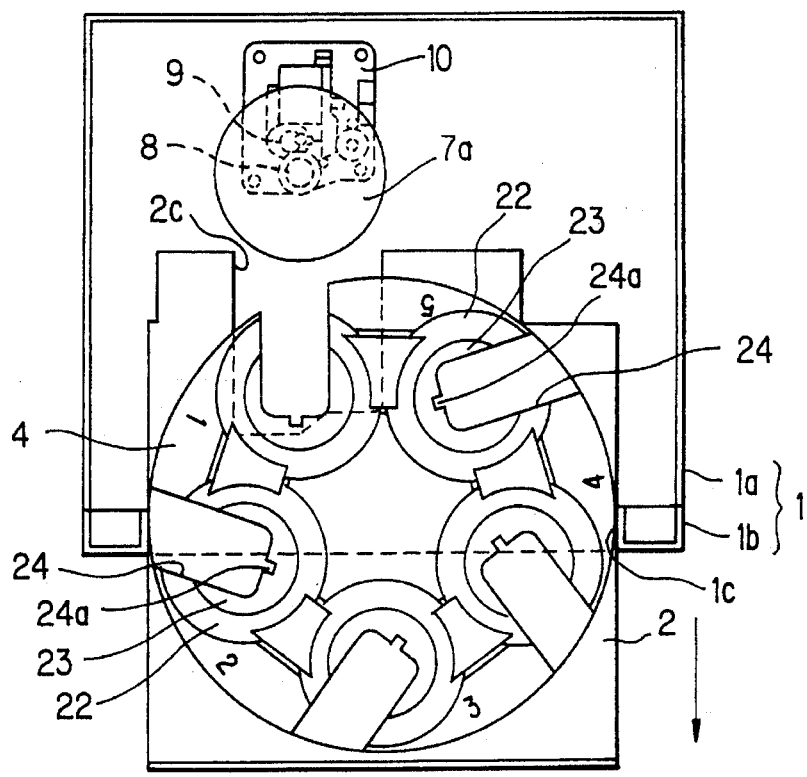
FIG. 13 is a schematic view showing a state where the disc tray has been withdrawn during playback of the disc player shown in FIG. 1.

Next, the loading operation during playback will be explained. As shown in FIGS. 6, 8 and 13 through 16, the loading operation during playback is performed by the following operations. Incidentally, FIG. 8 shows an unloading condition where the disc tray 2 is completely drawn from the loading condition during playback. FIG. 13 schematically shows this condition.

Figure 14:
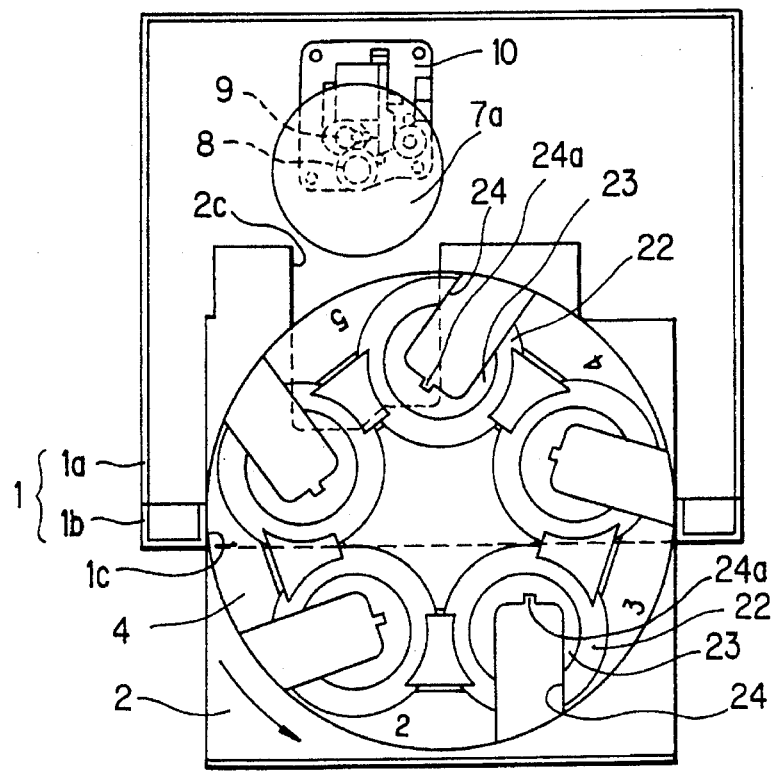
FIG. 14 is a schematic view showing a state where the turntable is somewhat rotated from the state shown in FIG. 13.

When the disc player is in play and the operating button 3b is turned on, the loading motor 32 is rotated in the reverse direction to that of the normal loading operation on the basis of the control signal supplied from the controller, and the main gear 29 is rotationally driven clockwise (FIG. 6). Thus, the reverse side gear 29b of the main gear 29 is engaged with the input side gear 28b of the reverse gear 28 to thereby rotationally drive the reverse gear 28 counterclockwise. As a result, through the action of the rack portion 2e engaged with the rack side gear 28a which is integral with the input side gear 28b, the disc tray 2 may be moved forwardly as shown in FIGS. 8 and 13. Then, as shown in FIG. 14, the turntable 4 is rotationally driven by the table rotating motor 18 to expose the addresses 2 and 3 outside.

As a result, the disc tray 2 and the turntable are widely exposed in front of the casing 1, and it is possible to load the optical discs 7a, 7b onto the exposed addresses 2 and 3. In this case, since the main gear 29 and the up-and-down member 37 are separately formed and the rotation of the up-and-down member 37 is prevented by the main gear 29, it is possible to prevent any unnecessary vibration, to be generated by the rotation of the main gear 29, from being applied to the swing member 10 through the up-and-down member 37. Accordingly, since there is no fear that the unnecessary vibration caused by the rotation of the main gear 29 would be applied to the swing member 10, it is possible to change the optical discs 7a, 7b without any adverse affect to the playback operation even during the in-play condition.

Thus, in this embodiment, the rotational angle of the turntable is controlled so that the two optical discs may be replaced at once by other ones. For this reason, in the state shown in FIG. 14, each of the cutaway slots 24 of the addresses 1 and 5 which are the disc receiving positions closest to the positions where the rotary drive mechanism 8 and the optical pickup 9 are located is displaced or offset in the rotational direction. Accordingly, if the disc tray 2 is depressed without any operation, since the swing member 10 is in the playback condition where the swing member 10 is raised, the rotary drive mechanism 8 and the like loaded on the swing member 10 are brought into contact with the turntable 4 so that there is a fear that the rotary drive mechanism 8 and the like would be damaged. In order to avoid such a damage, the lock mechanism is operated.

Namely, when the main gear 29 has been rotated through a predetermined angle, the cam portion 29h formed on the main gear 29 is brought into pressing contact with the cam input portion 40b of the lock lever 40 so that the lock lever 40 is swung counterclockwise in FIG. 8. As a result, the stopper portion 40a formed at the tip end of the lock lever 40 is projected into the movement path of the stopper receiving portion 2g formed on the disc tray 2. Accordingly, when the disc tray 2 is depressed, the stopper receiving portion 2g is brought into contact with the stopper portion 40a of the lock lever 40 to thereby prevent the depression of the disc tray 2. Consequently, it is possible to obviate the fear that the turntable 4 would be depressed by the rotary drive mechanism 8 so that the like in play and the rotary drive mechanism 8 and the like would be damaged.

Figure 15:
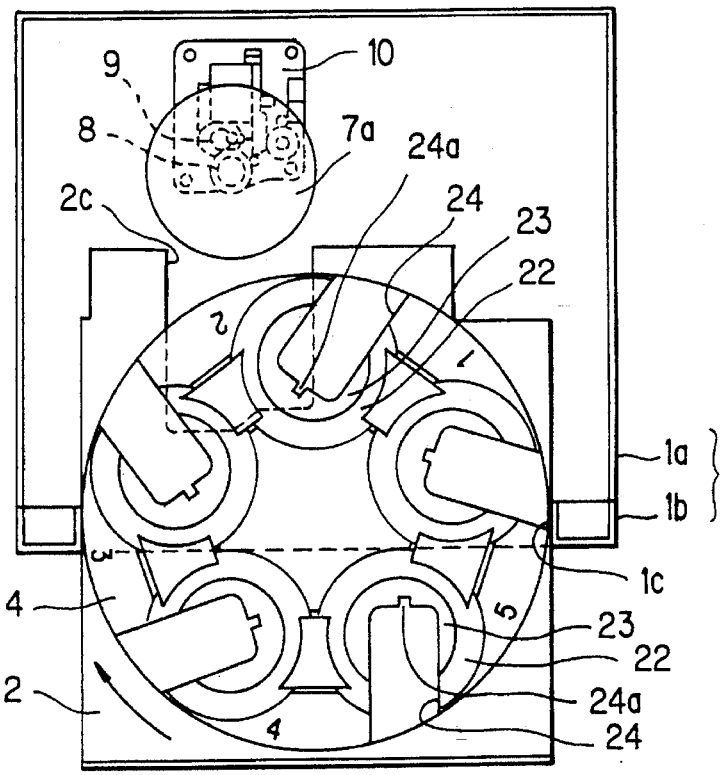
FIG. 15 is a schematic view showing a state where the turntable is skipped from the state shown in FIG. 14.

After the optical discs 7a, 7b have been replaced by new ones as described above, in the case where optical discs 7a are to be loaded on the other addresses 4 and 5 which are vacant, the skip button 3c is turned on. Thus, the turntable 4 is angularly shifted in the clockwise or counterclockwise direction as shown in FIG. 15 through the action of the table rotating motor 18 in accordance with the output of the controller so that the vacant addresses 4 and 5 are exposed outside. For this reason, it is possible to replace the optical discs, which have been loaded in advance in the addresses 4 and 5, by other optical discs.

As described above, in the case where the disc tray 2 is depressed from the state shown in FIG. 14 or 15, the operating button 3b is turned on for the loading condition. This operation is opposite to the foregoing unloading operation.

Figure 16:
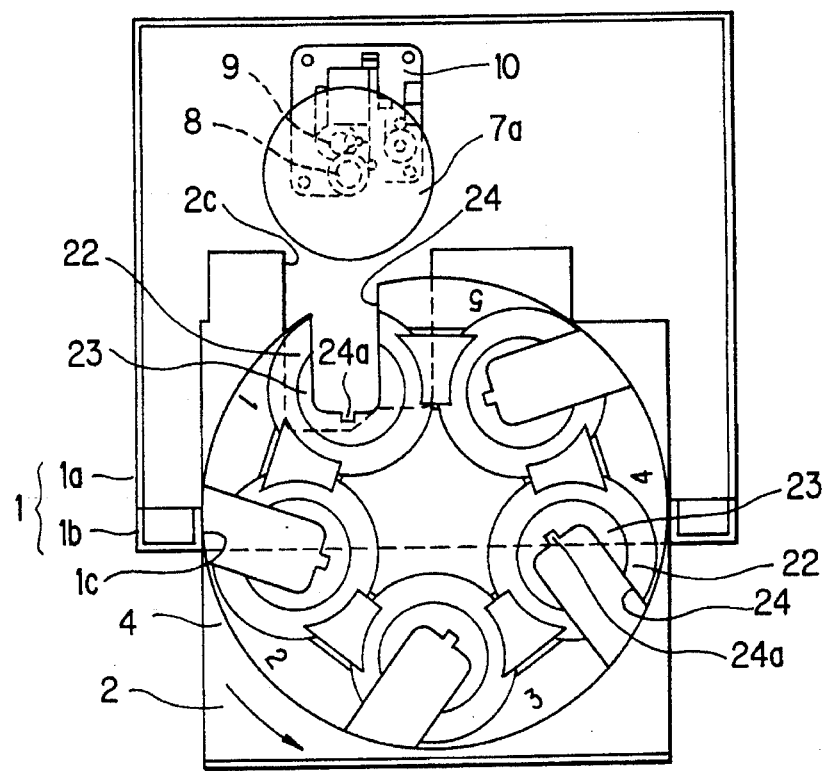
FIG. 16 is a schematic view showing a state where the turntable has been rotated from the state shown in FIG. 15 back to the state shown in FIG. 13.

Namely, when the operating button 3b is turned on, as shown in FIG. 16, the turntable 4 is rotated in the opposite direction to that of the above-described operation back to the initial position (shown in FIG. 13) by the table rotating motor 18 in accordance with the operation of the controller. Next, the loading motor 32 is again rotated in the reverse direction and the main gear 29 is rotationally driven in the counterclockwise direction. As a result, the rotational torque of the main gear 29 is transmitted from the reverse side gear 29b to the input side gear 28b of the reverse gear 28, and further transmitted from the rack side gear 28a of the reverse gear 28 through the rack portion 2e to the disc tray 2. As a result, the disc tray 2 and the turntable 4 are depressed to the state shown in FIG. 9 from the state shown in FIG. 16 where these components are widely withdrawn.

In the loading operation, in the case where the optical disc is loaded on the large diameter recess portion 22 or small diameter recess portion 23 which faces the rotary drive mechanism 8 or the like, the disc detection optical sensor 26 detects the presence of the optical disc, and its detection signal is inputted into the controller. As a result, the controller controls the table rotating motor 18 to rotate the turntable 4 so that the vacant address at which any disc is not loaded faces the rotary drive mechanism 8 and the like. Accordingly, in this case, the optical disc under the in-play condition is received in the vacant addresses, i.e., DISC 1 in the embodiment.

Incidentally, since the angle θ per one gear tooth is the same between the rack side gear 28a and the input side gear 28b of the reverse gear 28 which are different in pitch circle, it is unnecessary to position the reverse gear 28 with high precision in fabrication and it is possible to fabricate the reverse gear 28 at any desired position. Accordingly, unlike the conventional fabrication, it is unnecessary to use a special jig for positioning the reverse gear 28 or an alignment mark to mechanical parts. In any fabrication position, the rack side gear 28a is always engageable with the rack portion 2e of the disc tray 2 with a predetermined positional relation, and also, it is possible to realize the engagement between the input side gear 28b and the reverse side gear 29b of the main gear 9, which leads to the high efficiency of the fabrication.

The control operation for loading or unloading the disc tray of the disc player through the controller according to the present invention will be described.

Figure 18:
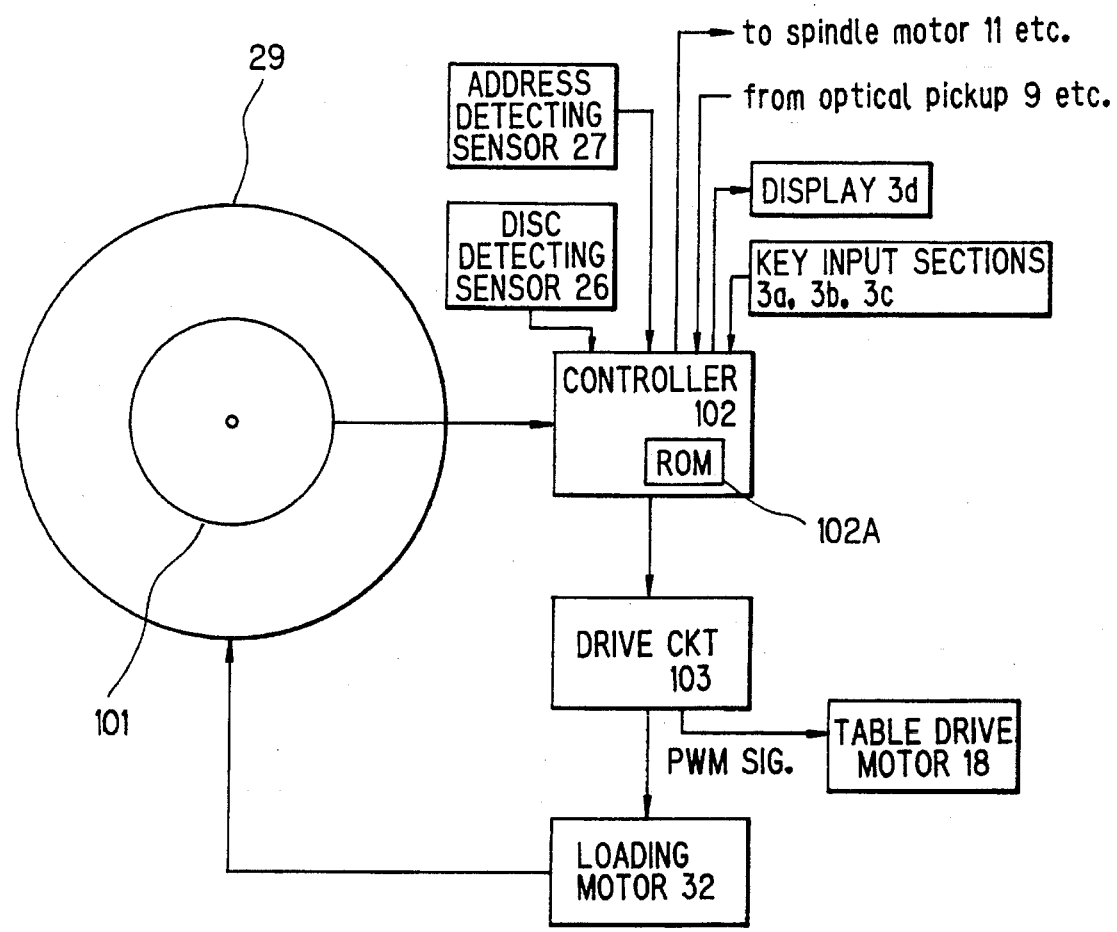
FIG. 18 is a block diagram showing an example of a structure of a primary circuitry for driving a loading motor.

FIG. 18 is a block diagram showing a circuitry mainly for controlling the drive of the main gear 29. An encoder 101 is provided on the bottom side of the main gear 29. As shown in FIG. 19, the encoder 101 is composed of a rotary plate (not shown) mounted on the bottom surface of the main gear 29 and rotated together with the main gear 29 and a conductive plate 111 mounted on a stationary part of the disc player. A plurality of brushes 112 which are brought into contact with patterns 111a and 111b of the conductive plate 111 and are slidingly moved along the patterns are provided on the rotary plate. The number of the plural brushes 112 is determined in correspondence with the patterns of the conductive plate 111. The output signal from the encoder 101 is continuously outputted in accordance with the rotation of the main gear 29 and is supplied to the controller 102. The controller 102 is constituted by a microcomputer. As mentioned above, inputted into the controller 102 are the input signals from the disc detecting optical sensor 26, the address detecting optical sensor 27, key input unit such as power source button 3a, operating button 3b, skip button 3c and other buttons and the output signals from the optical pickup 9. The controller 102 controls the control of the table drive motor 18 and the recording or reproducing operation of the entire disc player. Furthermore, the controller 102 supplies to the drive circuit 103 control signals for driving the motor 32 on the basis of the output signals from the encoder 101. Incidentally, the controller 102 incorporates therein a ROM 102A (later described) for storing data for determining a duty of PWM (pulse width modulation) signals to be supplied to the loading motor 32. The drive circuit 103 produces PWM signals as drive signals for driving the loading motor 32 on the basis of the control signals from the controller 102 and supplies the produced PWM signals to the loading motor 32. As a result, the loading motor 32 is controlled in accordance with the PWM signals from the drive circuit 103 to rotate the main gear 29 for carrying out the loading or unloading operation of the disc tray 2 as described above.

In the encoder 101, when the rotary plate (not shown) is rotated together with the main gear 29, the brushes 112a and 112b are slidingly moved along the patterns 111a and 111b of the conductive plate 111. In this case, as shown in FIG. 19, the patterns 111a and 111b of the conductive plate 111 are formed so as to change the electric connection between the patterns 111a and 111b and the brushes 112a and 112b in accordance with the pattern shapes. The shapes of the patterns of the conductive plate 111 are suitably selected as desired, so that it is possible to continuously obtain the position detection signals corresponding to the rotational position of the main gear 29.

The output signals S1 and S2 which are obtained from the brushes 112a and 112b as a result of the sliding movement along the patterns 111a and 111b of the conductive plate 111 of the encoder 101 are changed as shown in FIGS. 20(*a*) and 20(*b*). As shown in FIG. 20(*a*), the output signal S1 of the brush 112*a* is changed at a high level up to time $t_3$ and at a low level at time $t_3$. In contrast, as shown in FIG. 20(*b*), the output signal S2 of the brush 112*b* is changed from a high level to a low level at time $t_1$ and changed from the low level to the high level at time $t_2$. The output signal S2 is changed from the high level to the low level at time $t_4$. In the case where the disc tray 2 is moved in a direction indicated by an arrow OP in FIGS. 20(*a*) and 20(*b*), i.e., in the unloading operation, the movement of the disc tray 2 is braked by controlling the PWM signals to be supplied to the loading motor 32 and using the time $t_2$ as a brake application start point. As a result, it is possible to stop the disc tray 2 at the position where the disc tray 2 is projected from the opening 1*c* of the casing 1. The position where the disc tray 2 is projected from the casing 1 corresponds to time $t_1$ in FIGS. 20(*a*) and 20(*b*). Inversely, in the case where the disc tray 2 is moved in a direction indicated by an arrow CL in FIGS. 20(*a*) and 20(*b*), i.e., in the loading operation, the movement of the disc tray 2 is braked by controlling the PWM signals to be supplied to the motor 32 and using the time $t_3$ as a brake application start point. As a result, it is possible to stop the disc tray 2 at the position where the disc tray 2 is received in the casing 1 corresponding to the position of time $t_4$ in FIGS. 20(*a*) and 20(*b*).

The control operation of the loading motor 32 by the controller 102 will be explained with reference to FIGS. 21(*a*) to 21(*c*) and 22(*a*) to 22(*c*).

As shown in FIGS. 21(*a*) and 21(*b*), in the unloading operation of the disc tray 2, both the output signals S1 and S2 of the encoder 101 are kept at the high level. Under this condition, as shown in FIG. 21(*c*), the control signal is supplied to the drive circuit 103, and a PWM signal (PWM 1) having a first duty ratio is outputted from the drive circuit 103. The loading motor 32 is driven at a predetermined speed in accordance with the PWM signal (PWM 1) having the first duty ratio and subsequently, the main gear 29 is rotated at a predetermined speed in accordance with this. As a result, the disc tray 2 is unloaded at a predetermined speed on the basis of the rotational speed of the main gear 29 through the opening 1*c* of the casing 1. As shown in FIGS. 21(*a*) and 21(*b*), the output signals S1 and S2 from the encoder 101 are kept at the high level up to time $t_2$ when the output signal S2 is changed from the high level to the low level. It is possible to detect the state where the main gear reaches the predetermined rotational position by the fact that the output signal S2 is at the low level. In other words, it is possible to detect that the disc tray 2 has reached the predetermined position. On the basis of the detection result, the controller 102 supplies the control signal to the drive circuit 103 as shown in FIG. 21(*c*) and outputs a PWM signal (PWM 2) having a second duty ratio. For example, the duty of the PWM signal (PWM 2) having the second duty ratio is half the duty of the PWM signal (PWM 1) having the first duty ratio. As a result, the rotational speed of the loading motor 32 is delayed with respect to the state where the PWM signal (PWM 1) having the first duty ratio was supplied. At the same time, the rotational speed of the main gear 29 and the moving speed of the disc tray 2 are slower than those up to time $t_2$. Namely, the brake is effected. Accordingly, the disc tray 2 is moved at a moving speed on the basis of the PWM signal (PWM 2) having the second duty ratio at the time $t_2$. Thereafter the loading motor 32 is further rotated, and as shown in FIG. 21(*b*), at time $t_1$, the output signal S1 outputted from the encoder 101 is changed from the low level to the high level. This change is detected by the controller 102. On the basis of this detection result, the controller 102 supplies the control signal to the drive circuit 103 to stop the output of the PWM signal and to stop the drive of the loading motor 32. As a result, the rotation of the main gear 29 is stopped, the movement of the disc tray 2 is also stopped and the disc tray is stopped at the disc change position where the disc tray 2 is projected from the outer casing 1.

Subsequently, the loading operation of the disc tray 2 is carried out as follows. When the operating button 3*b* is operated and the loading command of the disc tray 2 is inputted into the controller 102, the controller 102 controls the loading motor 32 to rotate in the opposite direction to that of the unloading operation. As shown in FIG. 22(*c*), the controller 102 inputs the control signal to the drive circuit 103 to output a PWM signal (PWM 3) having a third duty ratio from the drive circuit 103 on the basis of the loading command. The loading motor 32 is rotated by the PWM signal (PWM 3) having the third duty ratio in the opposite direction to that of the unloading operation. In accordance with this, the main gear 29 is also rotated in the opposite direction to that of the unloading operation. As a result, the disc tray 2 starts to move and is retracted into the outer casing 1 through the opening 1*c*.

Thereafter, as shown in FIG. 22(*a*), when the controller 101 detects that the output signal S1 from the encoder 101 is changed from the high level to the low level at time $t_3$, the controller 101 supplies a control signal to the drive circuit 103 on the basis of the detection result. The drive circuit 103 outputs a PWM signal (PWM 4) having a fourth duty ratio on the basis of the supplied control signal. For example, the duty of the PWM signal (PWM 4) having the forth duty ratio is half the duty of the PWM signal (PWM 3) having the third duty ratio. The PWM signal (PWM 4) having the forth duty ratio is supplied to the loading motor 32 and the latter rotates slower than the rotational speed up to $t_3$. As a result, since the main gear 29 is rotated at a slower rotational speed than that up to time $t_3$, the moving speed of the disc tray 2 is slowed down. In other words, in the same manner as in the unloading operation, these components are subjected to a brake effect.

Furthermore, as shown in FIG. 22(*b*), at time $t_4$, when the controller 102 detects that the output signal S2 from the encoder 101 is changed from the high level to the low level, the controller 102 supplies a control signal to the drive circuit 103 on the basis of the detection result, .thereby stopping the output of the PWM signal from the drive circuit 103. As a result, the rotational drive of the loading motor 32 is stopped, and at the same time, the rotation of the main gear 29 is stopped. Thus, the disc tray 2 is also stopped. At this time, the disc tray 2 is stopped at a predetermined position within the outer casing 1.

As described above, the disc tray is smoothly stopped at the predetermined position when the disc tray is projected from the opening 1*c* of the outer casing 1 in the unloading operation and the tray is retracted into the outer casing 1 in the loading operation.

In the foregoing example, the two output signals S1 and S2 outputted from the encoder 101 are used to control the loading motor 32. However, it is possible to output three output signals S1, S2 and S3 from the encoder 101 by using three patters on the conductive plate 111 as shown in FIGS. 23(*a*) through 23(*e*). In the example shown in FIGS. 23(*a*) through 23(*e*), it is possible to control the loading motor 32 more finely than the example shown in FIGS. 21(*a*) to 21(*c*). Namely, in the example shown in FIGS. 23(*a*) through 23(*e*), stationary state. The change of the output signal S12 at time 13 is disregarded in the unloading operation. The disc tray actually starts to move at time $t_{14}$. Then, the main gear 29 is further rotated counterclockwise, and the disc tray 2 is moved in the direction in which the disc tray is projected through the opening 1c of the outer casing 1. As shown in FIG. 25(b), at time $t_{12}$, when the output signal S22 from the encoder 101 is changed from the high level to the low level, as described above, the controller 102 supplies a control signal to the drive circuit 103 to thereby decrease the duty of the PWM signal supplied from the drive circuit 103. As a result, the brake signal is applied to the loading motor 32 so that the moving speed of the disc tray 2 is decreased. Thereafter, at time $t_{11}$, when the controller 102 detects that the output signal S22 is changed from the low level to the high level, the control signal is supplied into the drive circuit 103 to stop the drive of the loading motor 32. As a result, the disc tray 2 is moved to and stopped at the position shown in FIG. 11, i.e., the unloading position.

In the unloading position, when the replacement and loading operation of the optical discs 7a, 7b on the turntable 4 is completed and the operating button 3b is operated to input the loading command to the controller 102, the controller 102 again drives the loading motor with the predetermined duty PWM signal outputted from the drive circuit 103 as described above. In this case, the respective output signals S12, S22 and S32 are changed in the direction indicated by an arrow $CL_1$ in FIGS. 25(a) to 25(c). As a result, the main gear 29 is rotationally driven clockwise, i.e., in the opposite direction to that of the unloading operation. In accordance with the rotation of the main gear in the clockwise direction, the output signal S22 from the encoder 101 is changed from the high level to the low level at time $t_{11}$ as shown in FIG. 25(b), and is changed from the low level to the high level at time $t_{12}$. This change is disregarded in the loading operation of the disc tray 2.

Thereafter, as shown in FIG. 25(a), at time $t_{13}$, the controller 102 detects that the output signal S12 from the encoder 101 is changed from the high level to the low level, the controller 102 supplies the control signal to the drive circuit 103. The drive circuit 103 supplies the loading motor 32 with a small duty PWM signal on the basis of the control signal. As a result, the loading motor 32 is subjected to the brake effect and the moving speed of the disc tray 2 is lowered. At time $t_{14}$, when the controller 102 detects that the output signal S22 from the encoder is changed from the high level to the low level, the control signal from the controller 102 is supplied to the drive circuit 103 and the output of the PWM signal from the drive circuit 103 is stopped. As a result, the movement of the disc tray 2 is stopped, and the disc tray 2 is retracted into the outer casing 1 as shown in FIG. 9. At this time, the loading motor 32 is once stopped. Thereafter, the turntable driving motor 18 is driven to rotate the turntable 4 to move the optical disc, to be aimed at on the turntable, to the position where the optical disc faces the disc table 12. The loading motor 32 is again rotated on the basis of the control signal from the controller 102, and the swing member 10 is moved from the lowered position to the raised position. As a result, the chucking plate 13 and the disc table 12 clamp the optical disc. As shown in FIG. 25(c), at time $t_{15}$, when the output signal S32 is changed from the high level to the low level, the controller 102 produces a control signal to stop the rotational drive of the loading motor 32. Under this condition, if the playback operation signal is inputted from the input section, the optical disc 7a, 7b is rotationally driven by the spindle motor 11 to read out the information signals recorded on the optical disc by the optical pickup 9.

During the playback operation of the optical disc 7a, 7b, when the unloading command is inputted into the controller 102 by the operating button 3b, the controller 102 controls the drive circuit 103 and supplies the PWM signal to rotationally drive the loading motor 32 clockwise in FIG. 6. As shown in FIG. 25(a), at time $t_{16}$, the output signal S12 from the encoder 101 is changed from the low level to the high level. At time $t_{15}$, the output signal S32 is changed from the high level to the low level. In the unloading operation, any process based upon these changes of the output signals is not performed. In this case, each output signal S12, S22 and S32 is changed in a direction indicated by an arrow $OP_2$ in FIGS. 25(a) to 25(c). Thereafter at time $t_{17}$, when the system controller 102 detects that the output signal S12 from the encoder 101 is changed from the high level to the low level, the system controller 102 generates the control signal to the drive circuit 103 on the basis of the detection result. The drive circuit 103 outputs to the loading motor 32 a PWM signal having a smaller duty ratio than that of the PWM signal supplied to the loading motor prior to time $t_{17}$, on the control signal. As a result, the loading motor 32 is subjected to the brake effect, and the moving speed of the disc tray 2 which is moving in the direction in which the disc tray 2 is projected through the opening 1c of the outer casing 1 is decreased. As shown in FIG. 25(b), at time $t_{18}$, when the system controller 102 detects that the output signal S22 from the encoder 101 is changed from the low level to the high level, the disc tray 2 reaches the unloading position during the playback as shown in FIG. 14 and stops smoothly. When the main gear 29 is further rotated, and at time $t_{19}$, as shown in FIG. 25(a), the output signal S12 from the encoder 101 is changed from the low level to the high level, the cam portion 29h of the main gear 29 depresses the cam input portion 40b of the lock lever 40 so that the lock lever 40 is swung in the counterclockwise direction in FIG. 8, and the stopper portion 40a is engageable with the stopper receiving portion 2g of the disc tray 2. If, under this condition, the disc tray is depressed, as described above, the stopper 40a engages with the stopper receiving portion 2g to lock the disc tray 2. A force is required to some extent for the lock operation. Therefore, the duty ratio of the PWM signal again supplied to the loading motor 32 for a period from time $t_{18}$ to time $t_{19}$ is increased. The drive of the loading motor 32 is stopped at time $t_{19}$. The loading operation during the playback is carried out in the same manner as in the loading operation in no playback. In this case, the output signals S12, S22 and S32 from the encoder 101 are changed in the direction indicated by the arrow $CL_2$ in FIGS. 25(a) to 25(c). The change of the output signals S12 and S22 at time $t_{17}$ and time $t_{18}$ is disregarded in the loading operation during the playback operation. When the loading command during the playback operation is inputted into the controller 102, on the basis of the control signal from the controller 102, the PWM signal having a predetermined duty ratio is outputted from the drive circuit 103. As a result, the loading motor 32 is rotationally driven to retract the disc tray 2 through the opening 1c of the outer casing 1. At time $t_{16}$, when the controller 102 detects that the output signal S12 from the encoder 101 is changed from the high level to the low level, the controller 102 generates a control signal to decrease the duty of the PWM signal outputted from the drive circuit 103. As a result, the loading motor is subjected to the brake effect, and the moving speed of the disc tray 2 is decreased. Thereafter, at time $t_{15}$, when the controller 102 detects that the output signal S32 is changed from the low level to the high level, the controller 102 supplies the control signal to the drive circuit 103 to stop the drive of the loading motor 32.

as best shown in FIG. 23(d), the loading motor 32 is driven by a PWM signal (PWM 5) having a fifth duty ratio up to time $t_5$ on the basis of the output signals S11, S21 and S31 from the encoder 101. As shown in FIG. 23(a), when the controller 102 detects that the output signal S11 is changed from the high level to the low level at time $t_5$, the controller 102 supplies a control signal to the drive circuit 103 to generate a PWM signal (PWM 6) having a sixth duty ratio from the drive circuit 103. The duty of the PWM signal (PWM 6) having the sixth duty ratio is half the duty of the PWM signal (PWM 5) having the fifth duty ratio. The loading motor 32 is driven up to time $t_6$ by the PWM signal (PWM 6) having the sixth duty ratio. The moving speed of the disc tray 2 from time $t_5$ to time $t_6$ is lower than the moving speed up to time $t_5$. Furthermore, when the controller 102 detects at time $t_6$ that the output signal S21 is changed from the high level to the low level as shown in FIG. 23(b), the controller 102 supplies the drive circuit 103 with a control signal to thereby output a PWM signal (PWM 7) having a seventh duty ratio. For example, the duty of the PWM signal (PWM 7) having the seventh duty ratio is half the duty of the PWM signal (PWM 6) having the sixth duty ratio. The loading motor 32 is driven for a period up to time $t_7$ by the PWM signal (PWM 7) having the seventh duty ratio. The moving speed of disc tray 2 for a period from time $t_6$ to time $t_7$ is further reduced relative to the moving speed of the disc tray for the period from time $t_5$ to time $t_6$. Thereafter, as shown in FIG. 23(c), at time $t_7$, when the controller 102 detects that the output signal S31 from the encoder 101 is changed from the high level to the low level, the controller 102 supplies a control signal to the drive circuit 103 to stop the output of the PWM signal from the drive circuit 103 and to stop the drive of the loading motor 32. At this time, an average voltage by the PWM signal supplied to the loading motor 32 is changed as shown in FIG. 23(e).

Figure 24A:
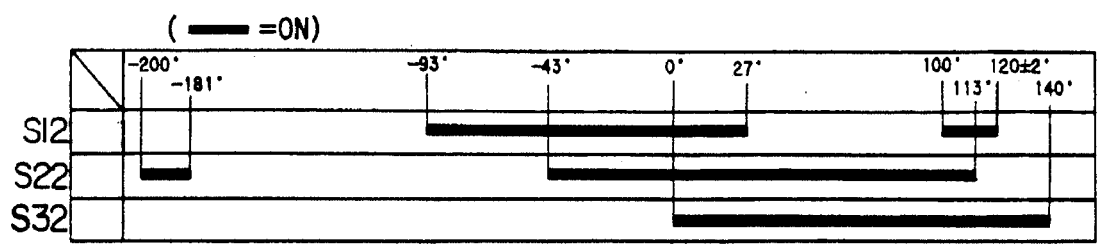
FIGS. 24(a) and 24(b) are plan views showing another example of a structure of the encoder, FIG. 24(a) being a view showing a change of patterns relative to a rotational angle, and FIG. 24(b) being a view showing a pattern of the encoder.
Figure 24B:
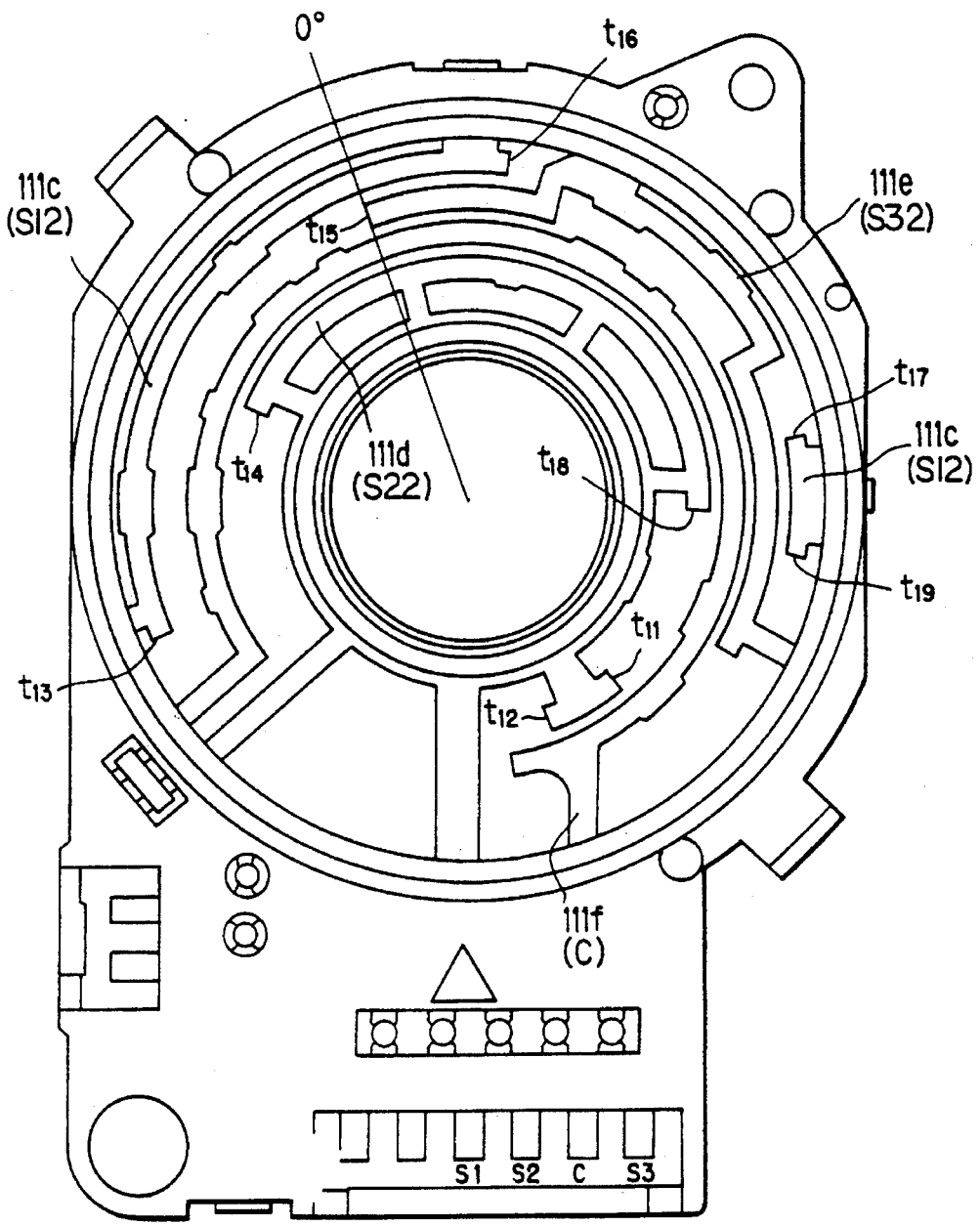

As mentioned above, in the example shown in FIGS. 23(a) to 23(e), it is possible to control the speed of the loading motor 32 more finely than the example shown FIGS. 21(a) to 21(c) and FIGS. 22(a) to 22(c). Accordingly, it is possible to stop the disc tray 2 more gently. FIG. 24(b) shows an example of a structure for the conductive plate 111 of the encoder 101. The three output signals S12, S22 and S32 shown in FIGS. 25(a) to 25(c) are outputted from the conductive plate 111 shown in FIG. 24(b). The patterns 111c, 111d and 111e for producing the output signals S12, S22 and S32 and the common pattern 111f (C) grounded are provided on the conductive plate 111. Each end of four brushes (not shown) mounted on the rotary plate (not shown) of the encoder 101 is electrically connected commonly to each other and the other end is slidingly contacted with an associated one of the patterns 111c, 111d, 111e and 111f as mentioned above. The output signal from the brush that slidingly moves on the pattern 111f is in the low level. As shown in FIG. 25(a), the output signal S12 from the brush that slidingly moves on the pattern 111c is changed from the high level to the low level at time $t_{13}$ and changed from the low level to the high level at time $t_{16}$. Further, the output signal S12 is changed from the high level to the low level at time $t_{17}$ and changed from the low level to the high level at time $t_{19}$. The pattern 111c is formed into a shape so as to obtain such an output signal S12. As shown in FIG. 25(b), the output signal S22 from the brush that slidingly moves on the pattern 111d is changed from the high level to the low level at time $t_{11}$ and changed from the low level to the high level $t_{12}$. Further, the output signal S22 is changed from the high level to the low level at time $t_{14}$ and changed from the low level to the high level at time $t_{18}$. In other words, the pattern 111d is formed in a shape so as to obtain such an output signal S22. The output signal S32 from the brush that slidingly moves on the pattern 111e is changed from the high level to the low level at time $t_{15}$ as shown in FIG. 25(c). The pattern 111e is formed in a shape so as to obtain such an output signal S32. Incidentally, as shown in FIGS. 24(a) and 24(b), zero degree is used as a reference in the embodiment. The zero degree in FIG. 24(b) corresponds to time $t_{15}$ in FIGS. 25(a) to 25(c). The "time $t_{15}$" shows the state where the disc tray 2 is retracted into the outer casing 1 and the swing member 10 is located at the raised position. Accordingly, time $t_{11}$ corresponds to a rotational angle of −200° in FIG. 24(a). In the same way, time $t_{12}$ corresponds to a rotational angle of −181°, time $t_{13}$ corresponds to a rotational angle of −93°, time $t_{14}$ corresponds to a rotational angle of −48°, time $t_{16}$ corresponds to a rotational angle of 27°, time $t_{17}$ corresponds to a rotational angle of 100°, time $t_{18}$ corresponds to a rotational angle of 113°, and time $t_{19}$ corresponds to a rotational angle of 120°±2°. Also, at time $t_{14}$, the disc tray 2 is retracted into the outer casing 1 and the swing member 10 is located at the lowered position. At time $t_{16}$, during the playback of the optical disc, the disc tray 2 is extracted from the outer casing 1, and the disc tray 2 is prevented from moving from this condition by the lock mechanism composed of the lock lever 40, the cam portion of the main gear 29 and the stopper receiving portion 2g of the disc tray 2 for preventing the disc tray from being depressed into the outer casing 1.

A range from time $t_{11}$ to time $t_{14}$ of FIGS. 25(a) to 25(c) is allotted for controlling the loading motor 32 in the loading or unloading operation of the disc tray 2 in the case where the optical disc 7a, 7b is in no playback. A range from time $t_{15}$ to time $t_{19}$ is allotted for controlling the loading motor 32 in the loading or unloading operation of the disc tray 2 in the case where the optical disc 7a, 7b is in no playback. Namely, when the disc tray 2 is under the retracted condition of the disc tray 2 into the interior of the outer casing 1, the output signals S12, S22 and S32 corresponding to the positions between time $t_{14}$ and $t_{15}$ are outputted from the encoder 101. At this time, the output signals S12 and S22 are at the low level and the output signal S32 is at the high level. These output signals S12, S22 and S32 are supplied into the controller 102, whereby on the basis of the levels of the output signals S12, S22 and S32, the controller 102 may detect the position of the disc tray 2. It is not always the case that in the turn-on of the power, the disc tray 2 is retracted into the outer casing 1. In this case, the controller 102 may judge the position of the disc tray 2 on the basis of the levels of the output signals S12, S22 and S32 from the encoder 101. On the basis of this judgement, the controller 102 produces a control signal and determines the rotational direction of the loading motor 32 and the duty of the PWM signals outputted from the drive circuit 103.

Figure 26:
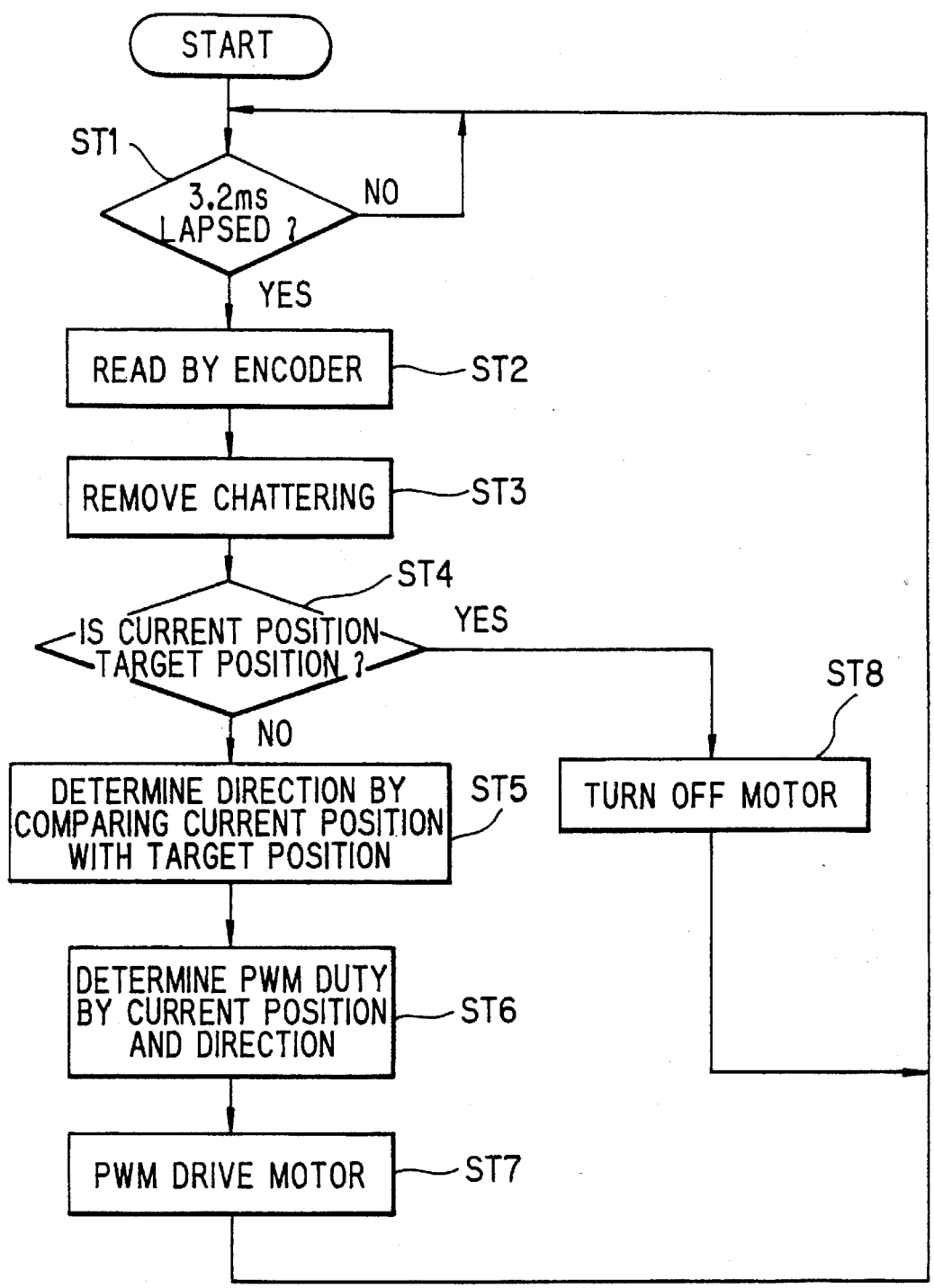
FIG. 26 is a flowchart for illustrating the operation of the embodiment shown in FIG. 18.

Now, assume that the optical disc 7a, 7b is in no playback. Under this condition, when the operating button 3b is operated and the command for unloading the disc tray 2 is inputted into the controller 102, as shown in FIG. 6, the main gear 29 is rotated counterclockwise. In this case, the output signals S12, S22 and S32 are changed on the time basis in the direction indicated by an arrow $OP_1$ in FIGS. 25(a) to 25(c). As a result, at time $t_{14}$, the output signal S22 is changed from the low level to the high level and at time $t_{13}$, the output signal S12 is changed from the low level to the high level. As described above, since the swing member 10 is moved from the raised position to the lowered position for the period up to the time $t_{14}$, the tray 2 is almost held at a The control operation of the controller 102 for performing the above-described loading or unloading operation will be explained with reference to FIG. 26. In step ST1, the controller 102 determines whether or not a predetermined time, for example, 3.2 (msec) lapses after the loading motor 32 has been driven. This is executed by repeating the process of step ST2 onward in every 3.2 (msec). The determination of the lapse of time for 3.2 (msec) is provided since other processes than the process of step ST2 onward are carried out together on the time sharing basis. Accordingly, the omission of the step ST1 will not affect the process of step ST2 onward at all.

In step ST1, if the controller determines that the predetermined time, 3.2 (msec), has lapsed, the program enters step ST2. In step ST2, the output signals S12, S22 and S32 from the encoder 101 are read out, and in step ST3, an adverse affect of chattering from each of the output signals S12, S22 and S32 is removed. Immediately after each of the output signals S12, S22 and S32 has been changed, the signal level is unstable. Under this level unstable condition, since there is a fear that an error detection would be made if the level of the each output signal is determined, a sampling operation is repeatedly carried out plural times, the controller 102 detects whether or not each result exhibits the same signal level, i.e., whether the result exhibits the high level or the low level as shown in FIGS. 25(a) to 25(c). When it is detected by the plural sampling operations that the signal level of the output signal is kept at the same level, the controller 102 takes the output signal as output signal data from the encoder 101. When the chattering is removed from the output signals, the program enters step ST4. In step ST4, the controller 102 determines on the basis of the level of each of the output signals S12, S22 and S32 from the encoder 101 whether or not the rotational position of the main gear 29, i.e., the position of the disc tray 2 relative to the disc player has reached a target position. As shown in FIGS. 25(a) to 25(c), the respective output signals S12, S22 and S32 are different from each other depending upon the position of the disc tray 2. By determining whether the output signals S12, S22 and S32 are at the high or low level, the position of the disc tray 2 is detected. If, in step ST4, it is judged that the current position and the target position are not equal to each other, the program enters step ST5. In step ST5, the current position and the target position are compared with each other, the rotational direction of the main gear 29 is determined. The controller 102 determines on the basis of the signal levels of the respective signals S12, S22 and S32 the rotational direction of the main gear 29 depending upon where the disc tray 2 is present in a range from $t_{11}$ to time $t_{19}$ in FIGS. 25(a) to 25(c), whether the operation is the loading operation or the unloading operation during no playback, and whether the operation is the loading operation or unloading operation during playback. For example, if the operation is the loading operation of the disc tray in non playback of the disc 7a, 7b, the main gear 29 is rotationally driven clockwise in FIG. 6, whereas if it is the unloading operation, the main gear 29 is rotated counterclockwise. If the operation is the loading operation of the disc tray in playback of the disc 7a, 7b, the main gear 29 is rotationally driven ounterclockwise in FIG. 6, whereas if it is the unloading operation, the main gear 29 is rotated clockwise. Then, the program enters step ST6. In step ST6, the duty of the PWM signal to be supplied into the loading motor is determined on the basis of the current position of the disc tray 2 or the rotational position of the main gear 29 and the direction which has been determined in step ST5. As described above, since the current position is detected on the basis of the signal levels of the respective output signals S12, S22 and S32 from the encoder 101, the duty of the PWM signal is determined on the basis of this result. For example, if the operation is the unloading operation of the disc tray during no playback, for the PWM signal in a range from $t_{14}$ to $t_{12}$, the PWM signal having the duty corresponding to the first duty ratio PWM signal (PWM 1) shown in FIG. 21(c) is outputted from the drive circuit 103. Thereafter, for a duty from $t_{12}$ to time $t_{11}$, for example, the PWM signal having a duty corresponding to the second duty ratio PWM signal (PWM 2) is outputted from the drive circuit 103. In other words, as described above, the period immediately before the disc tray has reached the position where the disc tray 2 is withdrawn from the opening 1c of the outer casing 1 and the period immediately before the disc tray 2 has reached the position where the disc tray 2 is retracted into the outer casing 1 are set to have smaller duty of the PWM signal than the periods prior to the periods. The determination of the duty of the PWM signal is carried out on the basis of data stored in the ROM 102A within the controller 102 or a conversion table. Then, the program enters step ST7. The PWM signal is supplied to the loading motor 32 from the drive circuit 103 on the basis of the duty determined in step ST6, and the motor 32 is driven. After step ST7, the program returns again back to ST1 and it is determined whether 3.2 (msec) has lapsed or not. If 3.2 msec has lapsed, the operation for taking the outputs from the encoder 101 is carried out again.

In the case where, in step ST4, it is determined that the current position and the target position are coincident with each other, the program enters step ST8 where the rotation of the loading motor 32 is stopped. In the condition of step ST8, since the disc tray 2 is at the position where the disc tray is withdrawn through the opening 1c of the outer casing 1, i.e., the replacement position or at the position where the disc tray 2 is retracted into the outer casing 1, i.e., the playback position, the replacement of the optical discs or the playback operation of the optical disc is carried out.

In the foregoing embodiment, the encoder is of a contact type but it is apparent to use any type of encoder that can continuously detect the rotation of the main gear in accordance with the rotation of the main gear and continuously obtain the detection signals. For example, in the case of an optical encoder, an encoder plate formed with patterns such as slits that are optically detectable corresponding to the conductive plate is mounted on the main gear so that it can be rotated together with the main gear and the optical patterns may be detected by using a light source and an optical sensor.

In the foregoing embodiment, the disc player using optical discs as disc-like recording media is explained but any type of recording media other than the disc-like recording media may be used. It is possible to apply the invention to a recording and/or reproducing apparatus which uses a tape-like recording media such as tape cassettes or cartridges as recording media.

Also, in the foregoing embodiment, the disc layer in which a plurality of discs are laid on the turntable arranged on the disc tray and the optical disc is selectively reproduced by turning the turntable has been explained. However, the invention is not limited thereto but may be applied to a recording and/or reproducing apparatus or recorder using rewritable optical discs.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. An apparatus for loading a recording medium, comprising:

a transfer member for transferring the recording medium between a recording medium changing position and a recording medium recording and/or reproducing position;

drive means connected to said transfer member for driving said transfer member, said drive means including a rotary drive unit for driving said transfer member, wherein said rotary drive unit comprises a drive motor and a gear to which a drive force is supplied from said drive motor, said gear being engaged with said transfer member for driving said transfer member between said changing position and said recording and/or reproducing position, and a detecting unit for continuously detecting a rotational amount of said rotary drive unit wherein said rotational amount corresponds to a position of said transfer member and wherein said detecting unit comprises a conductive plate mounted on a stationary part of said apparatus and on which a plurality of electrically conductive patterns are provided and a plurality of brushes mounted on said gear which move together with a rotation of said gear for contact with said conductive plate; and control means for controlling said rotary drive unit in response to a detection signal from said detecting unit so that a moving speed of said transfer member is gradually decreased as said transfer member nears one of said recording medium changing position and said recording and/or reproducing position.

2. An apparatus for loading a disc-like recording medium, comprising:

a transfer member for transferring the disc-like recording medium between a disc-like recording medium changing position and a disc-like recording medium recording and/or reproducing position;

drive means connected to said transfer member for driving said transfer member and including a gear having a drive force supplied thereto by a drive motor, wherein said gear is engaged with said transfer member for driving said transfer member between said changing position and said recording and/or reproducing position;

detecting means for continuously detecting a position of said transfer member moved by a drive force from said drive means in accordance with said movement of said gear of said drive means, wherein said detecting unit comprises a conductive plate mounted on a stationary part of said apparatus and on which a plurality of electrically conductive patterns are provided, and a plurality of brushes mounted on said gear which move together with said movement of said gear for contact with said conductive plate; and control means for controlling said drive means in response to a detection signal from said detecting means so that a moving speed of said transfer member is gradually decreased as said transfer member nears one of said recording medium changing position and said recording and/or reproduction position.

3. The apparatus according to claim 2, wherein a drive operation of said drive motor is controlled by a pulse width modulation signal supplied as a control signal from said control means.

4. The apparatus according to claim 3, wherein said drive means includes a drive circuit receiving said control signal produced by said control means in response to the detection signal from said detecting means for producing said pulse width modulation signal having a duty based upon the control signal.

5. A method for controlling a transfer device for transferring a recording medium by using a transfer member which transfers the recording medium between a recording medium changing position and a recording and/or reproducing position relative to the recording medium by a drive force transmitted from drive means to which a pulse width modulation signal is supplied, wherein the drive means includes a gear having said drive force supplied thereto by a drive motor and wherein the gear is engaged with the transfer member for driving the transfer member between the changing position and the recording and/or reproducing position, said method comprising the following steps of:

continuously detecting a position of said transfer member by detecting means in accordance with a movement of said gear of said drive means by contacting a plurality of electrically conductive patterns formed on a conductive plate mounted on a stationary part of the apparatus with a plurality of brushes mounted on the gear so that the plurality of brushes move together with said movement of the gear for contact with the conductive plate;

producing a control signal for controlling a duty of the pulse width modulation signal in accordance with the position of said transfer member in response to a detection signal from said detection means obtained in said step of continuously detecting; and changing the duty of the pulse width modulation signal on a basis in response to the control signal produced in said control signal producing step to gradually decrease a moving speed of said transfer member when said transfer member nears one of said recording medium changing position and said recording and/or reproducing position.

* * * * *

UNITED STATES PATENT AND TRADEMARK OFFICE
CERTIFICATE OF CORRECTION

PATENT NO. : 5,513,157
DATED : April 30, 1996
INVENTOR(S) : Kenji SAITO, Kanji MITA and Hajime KANNO It is certified that error appears in the above-indentified patent and that said Letters Patent is hereby corrected as shown below:

Col. 1 line 37, change "Other" to --other--
Col. 6, line 23, after "which" insert --is--
Col. 7, line 49, change "hag" to --has--
Col. 14, line 11, change "9" to --29--

Signed and Sealed this

Twenty-sixth Day of August, 1997

*Attest:*

BRUCE LEHMAN

*Attesting Officer*      *Commissioner of Patents and Trademarks*